(12) United States Patent
Hoang et al.

(10) Patent No.: US 7,848,651 B2
(45) Date of Patent: Dec. 7, 2010

(54) SELECTIVE DISTRIBUTION MESSAGING SCHEME FOR AN OPTICAL NETWORK

(75) Inventors: Khoi Nhu Hoang, Pleasanton, CA (US); Santosh Kumar Sadananda, Mountain View, CA (US)

(73) Assignee: Dynamic Method Enterprises Limited, Hong Kong (HK)

( * ) Notice: Subject to any disclaimer, the term of this patent is extended or adjusted under 35 U.S.C. 154(b) by 0 days.

(21) Appl. No.: 10/862,181

(22) Filed: Jun. 3, 2004

(65) Prior Publication Data

US 2004/0246914 A1 Dec. 9, 2004

Related U.S. Application Data

(63) Continuation of application No. 10/455,933, filed on Jun. 6, 2003.

(51) Int. Cl.
*H04J 14/00* (2006.01)

(52) U.S. Cl. .................................................. 398/57

(58) Field of Classification Search .................. 398/49, 398/57; 370/255
See application file for complete search history.

(56) References Cited

U.S. PATENT DOCUMENTS

| | | | |
|---|---|---|---|
| 5,351,146 A | 9/1994 | Chan et al. | |
| 5,781,537 A | 7/1998 | Ramaswami et al. | |
| 5,914,798 A | 6/1999 | Liu | |
| 6,069,894 A | 5/2000 | Holender et al. | |
| 6,111,673 A | 8/2000 | Chang et al. | |
| 6,304,349 B1 | 10/2001 | Alanyali et al. | |
| 6,445,844 B1 | 9/2002 | Neukermans et al. | |
| 6,738,354 B1 | 5/2004 | Ashwood Smith | |
| 6,741,572 B1 | 5/2004 | Graves et al. | |
| 6,791,948 B1 | 9/2004 | Desnoyers et al. | |
| 6,917,759 B2 * | 7/2005 | de Boer et al. | 398/5 |
| 6,987,899 B2 | 1/2006 | Fukashiro et al. | |

(Continued)

FOREIGN PATENT DOCUMENTS

WO PCT/US04/17735 11/2004

(Continued)

OTHER PUBLICATIONS

A. Shami et al., "Performance Evaluation of Two GMPLS-Based Distributed Control and Management Protocols for Dynamic Lightpath Provisioning in Future IP Networks", ICC 2002, Apr. 28-May 2, 2002.*

(Continued)

*Primary Examiner*—Shi K Li
(74) *Attorney, Agent, or Firm*—Blakely, Sokoloff, Taylor & Zafman, LLP

(57) ABSTRACT

A selective distribution messaging scheme for an optical network. According to one embodiment of the invention, a wavelength division multiplexing optical network includes a number of nodes each having an optical cross connect and each having stored therein a database representing conversion free connectivity from that node to others of the nodes. In addition, each of the nodes employs a messaging scheme to propagate notification of changes in the optical network to others of the nodes to maintain their databases. The messaging scheme in each of the nodes transmits messages to only selected ones of the other nodes based at least in part on the conversion free connectivity to minimize the number of communications between nodes.

20 Claims, 22 Drawing Sheets

U.S. PATENT DOCUMENTS

| | | | |
|---|---|---|---|
| 7,013,084 | B2 | 3/2006 | Battou et al. |
| 7,020,394 | B2 | 3/2006 | Zhang et al. |
| 7,039,009 | B2 | 5/2006 | Chaudhuri et al. |
| 7,065,580 | B1 | 6/2006 | Eberle et al. |
| 7,171,124 | B2 | 1/2007 | Smith et al. |
| 7,249,169 | B2 | 7/2007 | Blouin et al. |
| 7,283,741 | B2 | 10/2007 | Sadananda |
| 7,286,756 | B1 | 10/2007 | Marshall et al. |
| 7,327,683 | B2 * | 2/2008 | Ogier et al. ............... 370/236 |
| 2002/0018264 | A1 | 2/2002 | Kodialam et al. |
| 2002/0030864 | A1 | 3/2002 | Chaudhuri et al. |
| 2002/0097671 | A1 | 7/2002 | Doverspike et al. |
| 2002/0118647 | A1 | 8/2002 | Maeno |
| 2002/0120766 | A1 | 8/2002 | Okajima et al. |
| 2002/0126343 | A1 | 9/2002 | Fumagalli et al. |
| 2002/0154357 | A1 | 10/2002 | Ozveren et al. |
| 2002/0186432 | A1 | 12/2002 | Roorda et al. |
| 2002/0194339 | A1 | 12/2002 | Lin et al. |
| 2002/0196808 | A1 | 12/2002 | Karri et al. |
| 2003/0009582 | A1 | 1/2003 | Qiao et al. |
| 2003/0016414 | A1 | 1/2003 | Solheim et al. |
| 2003/0020982 | A1 | 1/2003 | Rychlicki et al. |
| 2003/0035166 | A1 | 2/2003 | Zhang et al. |
| 2003/0043427 | A1 * | 3/2003 | Robidas et al. ............ 359/110 |
| 2003/0065811 | A1 | 4/2003 | Lin et al. |
| 2003/0074443 | A1 | 4/2003 | Melaku et al. |
| 2003/0090995 | A1 | 5/2003 | Illikkal et al. |
| 2003/0172356 | A1 | 9/2003 | Pulkkinen et al. |
| 2003/0198227 | A1 | 10/2003 | Matsuura et al. |
| 2004/0190019 | A1 | 9/2004 | Li et al. |
| 2004/0228323 | A1 | 11/2004 | Acharya et al. |
| 2005/0243375 | A1 | 11/2005 | Ohyama et al. |

FOREIGN PATENT DOCUMENTS

| | | |
|---|---|---|
| WO | PCT/US04/17845 | 1/2005 |
| WO | PCT/US04/17845 | 12/2005 |

OTHER PUBLICATIONS

J. Moy, "OSPF Version 2", RFC-2328, IETF, Apr. 1998.*
Y. Imai, "XCAST6: eXplicit Multicast on IPv6", 2003 Symposium on Applications and the Internet Workshops, Jan. 27-31, 2003.*
N. Golmie et al., "A Differentiated Optical Services Model for WDM Networks", IEEE Communications Magazine, Feb. 2000.*
S. Sengupta et al., "Analysis of Enhanced OSPF for Routing Lights in Optical Mesh Networks", ICC 2002, Apr. 28-May 2, 2002.*
"Telecommunication System Engineering" by R. Freeman, John Wiley & Sons, 1980, pp. 99-103.*
P. Ho et al., "A Novel Distributed Control Protocol in Dynamic Wavelength-Routed Optical Networks", IEEE Communications Magazine, Nov. 2002.*
K. Teng et al., "Limited Scope Probing: A Distributed Approach for QoS-Based Routing", IEEE 2001.*
S. Sengupta et al., "Capacity Efficient Distributed Routing of Mesh-Restored Lightpaths in Optical Networks", IEEE 2001.*
Capacity Performance of Dynamic Provisioning in Optical Networks (2001) Ramu Ramamurthy (pp. 40-48).
Dynamic Lightpath Establishment in Wavelength-Routed WDM Networks (2001) Hui Zang, Jason P. Jue (pp. 100-108).
Capacity Efficient Distributed Routing of Mesh-Restored Lightpaths in Optical Networks (2001) Sudipta Sengupta, Ramu Ramamurthy (5 pgs).
Inference of Shared Risk Link Groups, Internet Working Group, Internet Draft, Document: draft-many-inference-srlg-01.txt, Category: Internet Draft, Expires: Jan. 2002; D. Papadimitriou, F. Poppe, J. Jones, S. Venkatachalam Alcatel, S. Dharanikota, R. Jain, Nayna Networks, R. Hartani, Caspian Networks, D. Griffith, NIST, Yong Xue, UUNet, Jul. 2001 (32 pages).
Inter-domain routing with Shared Risk Groups, draft-many-ccamp-srg-01.txt, CCAMP Working Group, Internet Draft, Document: draft-many-ccamp-srg-00.txt, Category: Internet Draft, Expires: Jun. 2002; S. Dharanikota, R. Jain (Nayna), D. Papadimitriou (Alcatel), R. Hartani (Cespian Networks), G. Bernstein (Ciena), V. Sharma (Metanoia), C. Brownmiller, Y. Xue (Worldcom), Dec. 2001 (32 pages).
Cisco MPLS Tunnel Builder Pro, Cisco Systems, Inc., 1992-2002 (10 pages).
International Telecommunication Union, ITU-T G.7715/Y.1706 (Jun. 2002), Series G: Transmission Systems and Media, Digital Systems and Networks, Digital terminal equipments—Operations, administration and maintenance features of transmission equipment, Series Y: Global Information Infrastructure and Internet Protocol Aspects, Internet protocol aspects—Operation, administration and maintenance, Architecture and requirements for routing in the automatically switched optical networks, ITU-T Recommendation G7715/Y.1706 (35 pages).
Effectiveness of Shared Risk Link Group Auto-Discovery in Optical Networks, Panagiotis Sebos, Jennifer Yates, Dan Rubenstein and Albert Greenberg 2000 (3 pages).
Survivable Networks Algorithms for Diverse Routing by Ramesh Bhandari, Ph.D, AT&T Laboratories, New Jersey, Kluwer Academic Publishers, Boston/Dordrecht/London 1999 (.
Standards Report, Standards Update: Routing for Optical Networks, Greg Bernstein, Grotto Networking, and Lyndon Ong, Ciena Corp., IEEE Optical Communications, Aug. 2003 (p. S4 and S6).
Calculation of Node disjoint path in Networks (5 pages).
Jukan et al. (A. Jukan et al.), "Constraint-based Path Selection Methods for On-demand Provisioning in WDM Networks," IEEE INFOCOM 2002.
Date, "An Introduction to Database Systems" by C. Date, Addision-Wesley, 1986, pp. 5-9, 29-41.
S. Sengupta et al., "Analysis of Enhanced OSPF for Routing Lightpaths in Optical Mesh Networks," IEEE 2002.
Moy, RFC-2328, "OSPF Version 2," IETF, Apr. 1998.
"Graph Theory with Applications to Engineering and Computer Science" by N. Deo, Prentice-Hall, 1974.
Jukan et al., Service-Specific Wavelength Allocation in QoS-Routed Optical Networks. IEEE 1998, pp. 2272.
Braden et al., RFC-2205. Resource Reservation Protocol (RSVP)—Version 1 Functional Specification. IETF, Sep. 1997, pp. 34-35.
Francisco et al., End-to-End Signaling and Routing for Optical IP Networks. IEEE 2002, Fig. 5.
Postel, RFC-791, Internet Protocol, IETF Sep. 1981, pp. 16.
Chadi Assi, Abdallah Shami and Mohaned A. Ali, Optical Networking and Real-Time Provisioning: An Integrated Vision for the Next-Generation Internet (Jul./Aug. 2001) pp. 36-45.
A. Sichani, et al., "A Novel Distributed Progressive Reservation Protocol for WDM All-Optical Networks", IEEE International Conferences on Communication, ICC'03, May 11-14, 2003.
P.Ho, et al., "A Framework for Service-Guaranteed Shared Protection in WDM Mesh Networks", IEEE Communications Magazine, Feb. 2002, pp. 97-103.
Fawaz, et al., Management of Optical Networks, "Service Level Agreement and Provisional in Optical Networks", IEEE Communications Magazine, pp. 36-43.
Xiao, et al., "Designand Analysis of Improved Shortest Path Tree Update for Network Routing", NSF EIA-0103709, Texas ARP 009741-0028-2001, USA pp. 6.
http://tisure.netw/cs311/fall-00/noes/graphs.html, notes for CS-311, Data Structures, Fall 2000.
Xiao, et al., "Reducing Routing Table Computation Cost in OSPF", printed on Jun. 7, 2005, pp. 1-11.
C.Assi, et al., "A Hybrid Distributed Fault-Management Protocol for Combating Single-Fiber Failures in Mesh-Based DWDM Optical Networks", Global Telecommunications Conference, Nov. 17-21, 2002, pp. 2676-2680.
C. Assi, et al., "Efficient Path Selection and Fast Restoration Algorithms for Shared Restorable Optical Networks", International Conference on Communications, ICC'03, May 11-15, 2003, pp. 1412-1416.

S. Sengupta, at al., "From Network Design to Dynamic Provisioning and Restoration in Optical Cross-Connect Mesh Networks: An Architectural and Algorithmic Overview", IEEE Network, Jul./Aug. 2001, pp. 46-54.

G. Papadimitriou, et al., "Optical Switching: Switch Fabrics, Techniques, and Architectures", Journal of Lightwave Technology, vol. 21, No. 2, Feb. 2003, pp. 384-405.

J. Lang, et al., "Link Management Protocol (LMP)", National Fiber Optical Engineers Conference (NFOEC), 2000, 10pgs.

T.E. Stern and Krishna Bala, "Wavelength/Waveband Routed Networks", Multipwavelength Optical Network, Addiso-Wesley, 2000.

Lang, et al., "Link Management Protocol", draft-ietf-mpls-lmp-02.txt, 2001.

Rajiv Ramaswami et al., "Optical Networks, A Practical Perspective" Second Edition, Morgan Kaufmann Publishers, ISBN 1-55860-655-6, San Francisco, CA, USA. (831 pages) 2002.

* cited by examiner

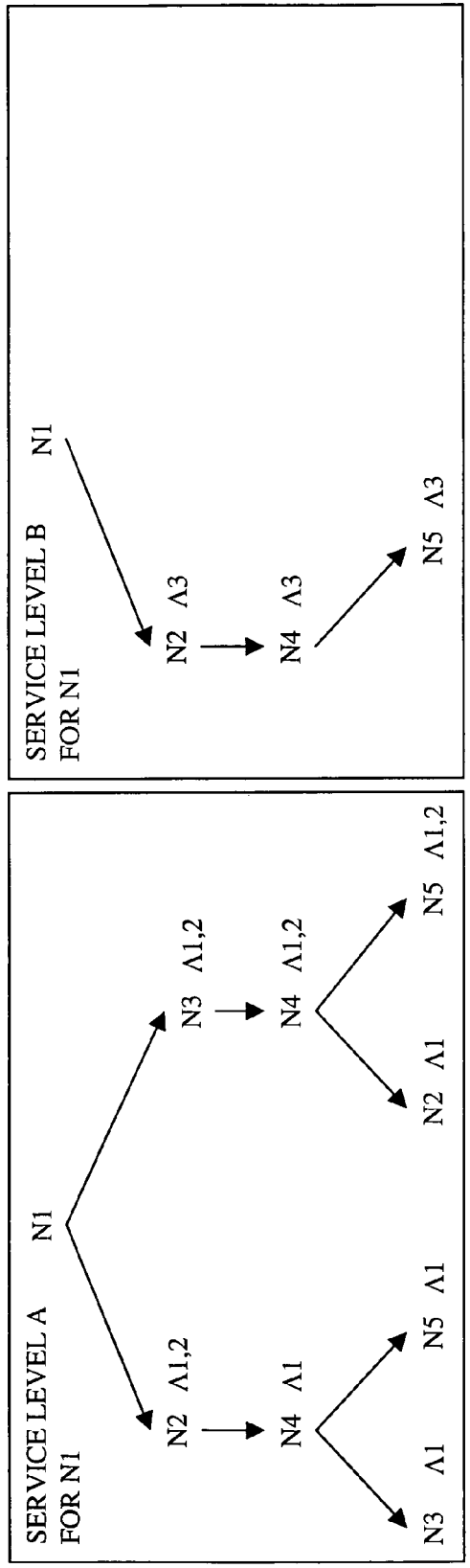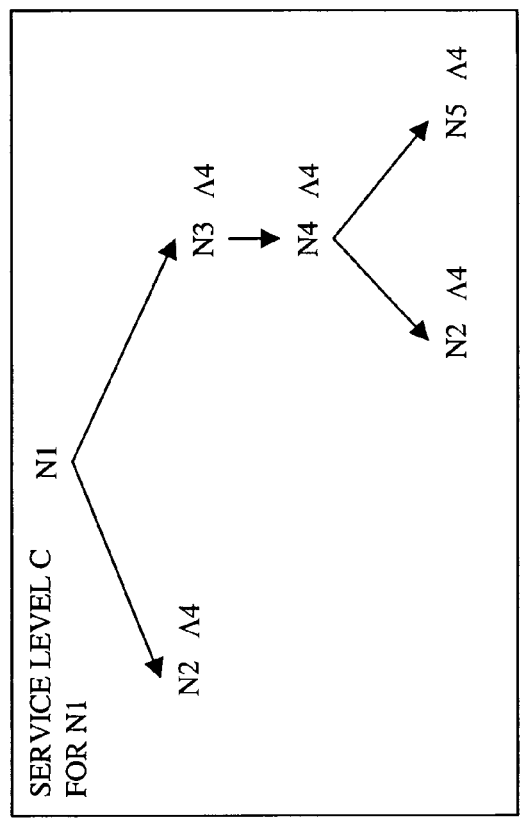
FIG 3A
FIG 3B
FIG 3C

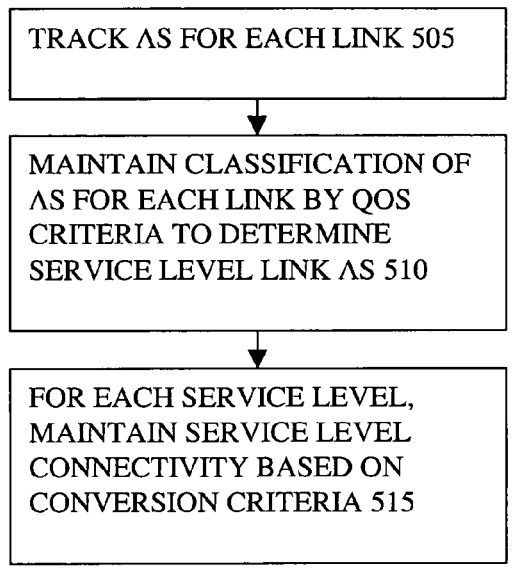
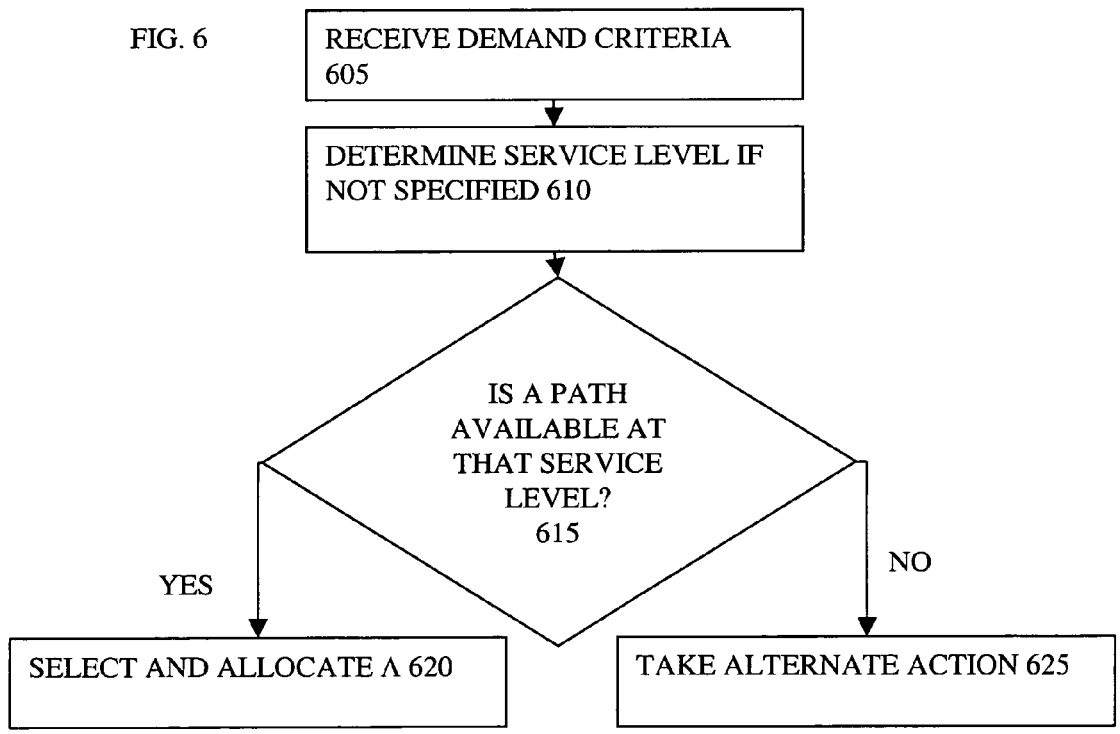

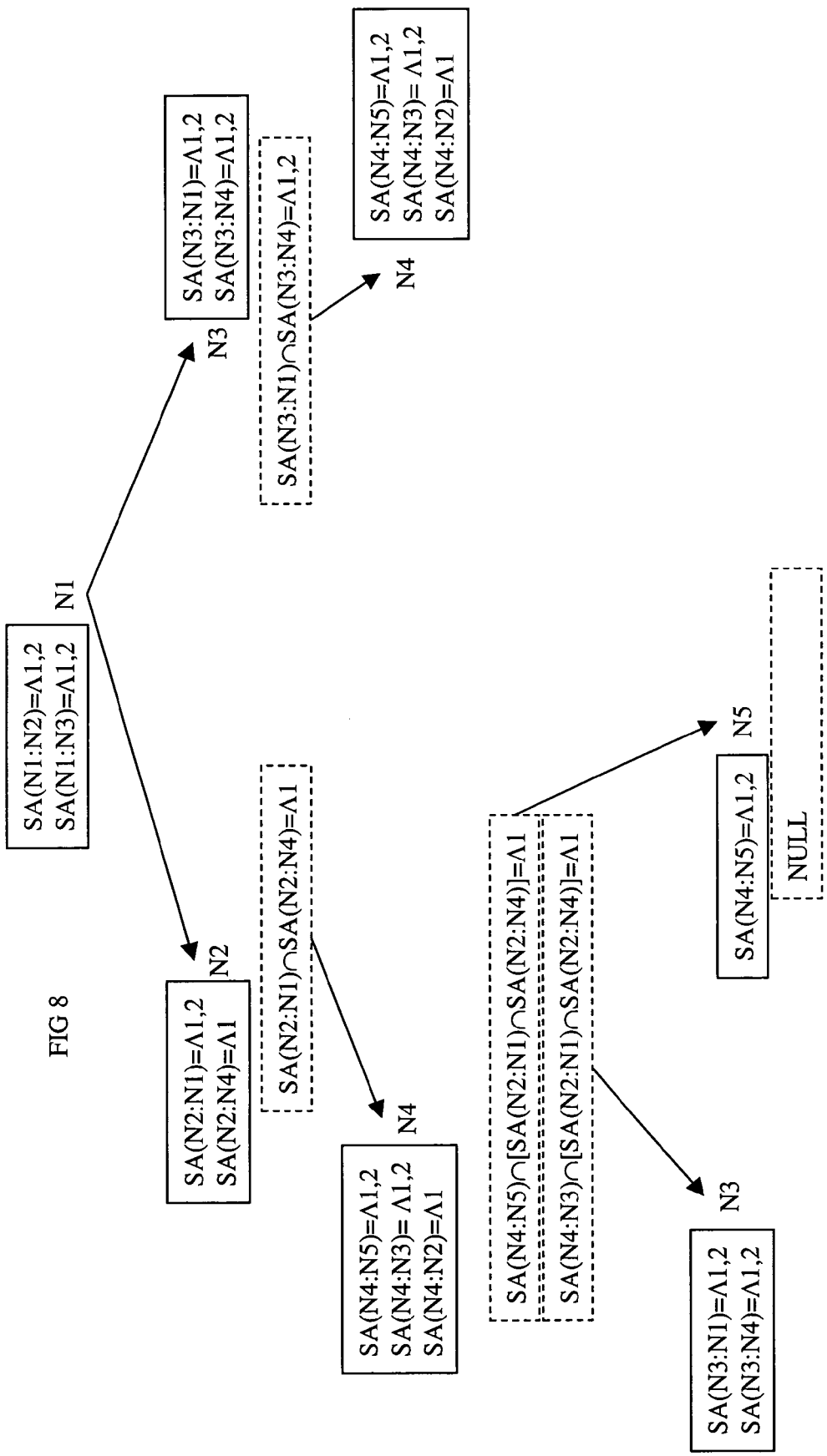

FIG. 9

- RESPONSIVE TO RECEIPT OF Λ PARAMETERS AND SERVICE LEVEL PARAMETERS 905
- DETERMINE THE NUMBER OF SERVICE LEVELS 910
- FOR EACH LINK TO AN ADJACENT NODE, CLASSIFY AS BY SERVICE LEVEL PARAMETERS TO FROM LINK SERVICE LEVEL CHANNEL SETS 915
- FOR EACH SERVICE LEVEL, INITIATE A SERVICE LEVEL TOPOLOGY BUILD UP 920

FIG. 10

- INSTANTIATE A SERVICE LEVEL TOPOLOGY STRUCTURE AND POPULATE WITH ANY QUALIFYING ADJACENT NODES (ADJACENT NODES FOR WHICH THIS SOURCE NODE HAS ANY NON-NULL LINK SERVICE LEVEL CHANNEL SETS AT THIS SERVICE LEVEL) 1005
- TRANSMIT CONNECTIVITY REQUEST MESSAGE(S) TO QUALIFYING ADJACENT NODE(S) 1010
- RESPONSIVE TO CONNECTIVITY RESPONSE MESSAGES(S), UPDATE THE SERVICE LEVEL TOPOLOGY STRUCTURE 1015

FIG. 17

```
┌─────────────────────────────────────────┐
│ RESPONSIVE TO A CHANNEL BEING ADDED OR  │
│ A CHANNEL WITHOUT LIVE TRAFFIC BEING    │
│ REMOVED 1705                            │
└─────────────────────────────────────────┘
                    │
                    ▼
┌─────────────────────────────────────────┐
│ DETERMINE SERVICE LEVEL OF THE          │
│ CHANNEL 1710                            │
└─────────────────────────────────────────┘
                    │
                    ▼
┌─────────────────────────────────────────┐
│ TRANSMIT CONNECTIVITY REQUEST           │
│ MESSAGE ON THE LINK WITH THE            │
│ CHANNEL 1715                            │
└─────────────────────────────────────────┘
                    │
                    ▼
┌─────────────────────────────────────────┐
│ RESPONSIVE TO CONNECTIVITY              │
│ RESPONSE MESSAGES(S), UPDATE THE        │
│ SERVICE LEVEL TOPOLOGY                  │
│ STRUCTURE 1720                          │
└─────────────────────────────────────────┘
                    │
                    ▼
┌─────────────────────────────────────────┐
│ TRANSMIT AN UPDATE ADD/REMOVE           │
│ CHANNEL MESSAGE TO THE NODES IN         │
│ THE SERVICE LEVEL TOPOLOGY              │
│ STRUCTURE THAT ARE NOT ON THE           │
│ LINK WITH THE CHANNEL 1725              │
└─────────────────────────────────────────┘
```

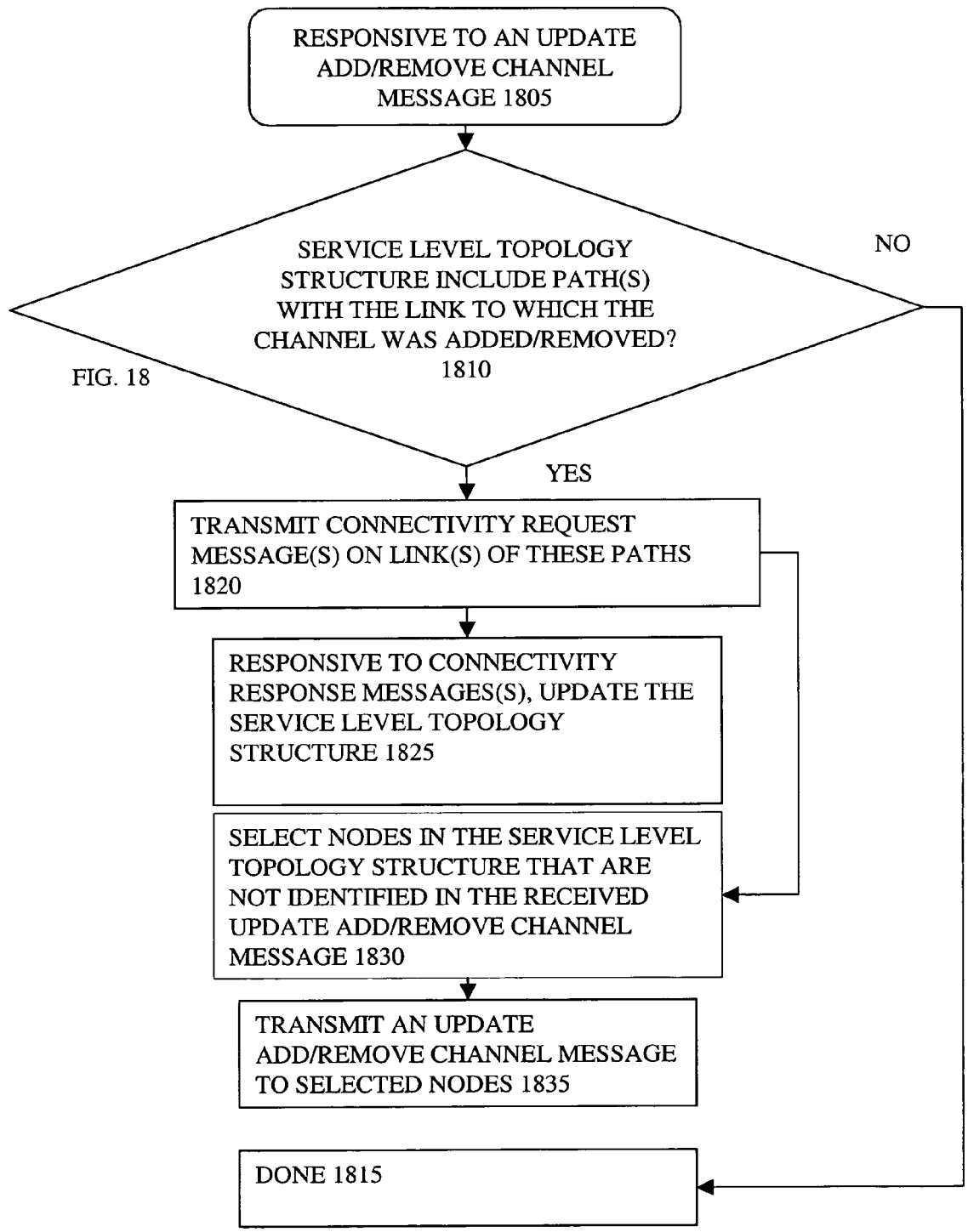

FIG. 25

```
RESPONSIVE TO A NODE ADDITION MESSAGE
2505
        │
        ▼
TRANSMIT CONNECTIVITY
REQUEST MESSAGE(S) TO
QUALIFYING ADJACENT
NODE(S) 2510
        │
        ▼
INSTANTIATE A NEW SERVICE
LEVEL TOPOLOGY STRUCTURE
AND UPDATE IT RESPONSIVE
RECEIVED CONNECTIVITY
RESPONSE MESSAGES 2515

SELECT NODES IN THE SERVICE LEVEL
TOPOLOGY STRUCTURE THAT ARE
NOT IDENTIFIED IN THE RECEIVED
NODE ADDITION MESSAGE 2520
        │
        ▼
TRANSMIT A NODE ADDITION
MESSAGE TO SELECTED NODES
2525
```

SELECTIVE DISTRIBUTION MESSAGING SCHEME FOR AN OPTICAL NETWORK

CROSS-REFERENCE TO RELATED APPLICATIONS

This is a continuation of application Ser. No. 10/455,933, filed Jun. 6, 2003, which is hereby incorporated by reference.

BACKGROUND

1. Field

Embodiments of the invention relate to the field of networking; and more specifically, to optical networks.

2. Background

Generalized Multiprotocol Label Switching (GMPLS) [RFC3471] extends the Multiprotocol Label Switching (MPLS) architecture [RFC3031] to encompass time-division (e.g., Synchronous Optical Network and Synchronous Digital Hierarchy, SONET/SDH), wavelength (optical lambdas) and spatial switching (e.g., incoming port or fiber to outgoing port or fiber).

GMPLS extends MPLS to include network devices whose forwarding plane recognizes neither packet, nor cell boundaries, and therefore, can't forward data based on the information carried in either packet or cell headers. Specifically, such network devices include devices where the forwarding decision is based on time slots (TDM), wavelengths (lambda), or physical (fiber) ports. GMPLS supports uni-directional label switched paths (LSPs) and bi-directional LSPs (For bi-directional LSPs, the term "initiator" is used to refer to a node that starts the establishment of an LSP and the term "terminator" is used to refer to the node that is the target of the LSP; Note that for bi-directional LSPs, there is only one "initiator" and one "terminator") and a special case of Lambda switching, called Waveband switching (A waveband represents a set of contiguous wavelengths which can be switched together to a new waveband; The Waveband Label is defined to support this special case; Waveband switching naturally introduces another level of label hierarchy; As far as the MPLS protocols are concerned there is little difference between a waveband label and a wavelength label.).

To deal with the widening scope of MPLS into the optical and time domain, there are several new forms of "label." These new forms of label are collectively referred to as a "generalized label." A generalized label contains enough information to allow the receiving node to program its cross connect, regardless of the type of this cross connect, such that the ingress segments of the path are properly joined. The Generalized Label extends the traditional label by allowing the representation of not only labels which travel in-band with associated data packets, but also labels which identify timeslots, wavelengths, or space division multiplexed positions. For example, the Generalized Label may carry a label that represents (a) a single fiber in a bundle, (b) a single waveband within fiber, (c) a single wavelength within a waveband (or fiber), or (d) a set of time-slots within a wavelength (or fiber). It may also carry a label that represents a generic MPLS label, a Frame Relay label, or an ATM label (VCI/VPI).

Thus, GMPLS forms label switched paths (LSPs) through the network. These paths may be connection oriented or connectionless. For instance, the Resource Reservation Protocol (RSVP) is often used to deploy connection oriented LSPs, whereas a label management protocol (LMP), such as the label distribution protocol (LDP), is often used to provision connectionless LSPs.

Optical Networks

An optical network is a collection of optical network devices interconnected by links made up of optical fibers. Thus, an optical network is a network in which the physical layer technology is fiber-optic cable. Cable trunks are interconnected with optical cross-connects (OXCs), and signals are added and dropped at optical add/drop multiplexers (OADMs). The optical network devices that allow traffic to enter and/or exit the optical network are referred to as access nodes; in contrast, any optical network devices that do not are referred to as pass-thru nodes (an optical network need not have any pass-thru nodes). Each optical link interconnects two optical network devices and typically includes an optical fiber to carry traffic in both directions. There may be multiple optical links between two optical network devices.

A given fiber can carry multiple communication channels simultaneously through a technique called wavelength division multiplexing (WDM), which is a form of frequency division multiplexing (I-DM). When implementing WDM, each of multiple carrier wavelengths (or, equivalently, frequencies or colors) is used to provide a communication channel. Thus, a single fiber looks like multiple virtual fibers, with each virtual fiber carrying a different data stream. Each of these data streams may be a single data stream, or may be a time division multiplex (TDM) data stream. Each of the wavelengths used for these channels is often referred to as a lamda.

A lightpath is a one-way path in an optical network for which the lamda does not change. For a given lightpath, the optical nodes at which its path begins and ends are respectively called the source node and the destination node; the nodes (if any) on the lightpath in-between the source and destination nodes are called intermediate nodes. An optical circuit is a bi-directional, end to end (between the access nodes providing the ingress to and egress from the optical network for the traffic carried by that optical circuit) path through the optical network. Each of the two directions of an optical circuit is made up of one or more lightpaths. Specifically, when a given direction of the end to end path of an optical circuit will use a single wavelength, then a single end to end lightpath is provisioned for that direction (the source and destination nodes of that lightpath are access nodes of the optical network and are the same as the ends nodes of the optical circuit). However, in the case where a single wavelength for a given direction will not be used, wavelength conversion is necessary and two or more lightpaths are provisioned for that direction of the end to end path of the optical circuit. Thus, a lightpath comprises a lamda and a path (the set of optical nodes through which traffic is carried with that lambda).

Put another way, when using GMPLS on an optical network, the optical network can be thought of as circuit switched, where LSPs are the circuits. Each of these LSPs (uni-directional or bi-directional) forms an end to end path where the generalized label(s) are the wavelength(s) of the lightpath(s) used. When wavelength conversion is not used for a given bi-directional LSP, there will be a single end to end lightpath in each direction (and thus, a single wavelength; and thus, a single generalized label).

An optical network device can be thought of comprising 2 planes: a data plane and a control plane. The data plane includes those components through which the light travels (e.g., the switch fabric or optical crossconnect; the input and output ports; amplifiers; buffers; wavelength splitters or optical line terminals; adjustable amplifiers; etc.), add/drop components (e.g., transponder banks or optical add/drop multiplexers, etc.), and components that monitor the light. The control plane includes those components that control the components of the data plane. For instance, the control plane is often made up software executing on a set of one or more microprocessors inside the optical network device which control the components of the data plane. To provide a specific example, the software executing on the microprocessor(s) may determine that a change in the switch fabric is necessary, and then instruct the data plane to cause that switch to occur. It should also be noted that the control plane of an optical network device is in communication with a centralized network management server and/or the control planes of one or more other network devices.

A number of different network topologies have been developed for optical network devices, including ring and meshed based topologies. Similarly, a number of different control planes and data planes have been developed for optical network devices. For instance, wavelength division multiplexing (WDM) necessitated an alteration of the data plane and the control plane. As another example, various different techniques have been used for implementing the switch fabric, including optical cross connects such as MEMS, acousto optics, thermo optics, holographic, and optical phased array.

Operating an optical network typically requires: A) building and maintaining network databases; and B) establishing lightpaths. For example, the network databases can include: 1) link state databases that track information (e.g., the link(s), lamda(s), lamda bandwidths, etc.) regarding adjacent optical nodes (e.g., using a link management protocol (LMP)); and 2) topology databases that track information (e.g., nodes, links, lamdas, etc.) for the physical connectivity of the nodes in a domain and/or the entire network (e.g., using OSPF-TE). In order to establish an LSP, the following operations are typically performed offline: 1) determining a shortest path/wavelength between the source and destination using a shortest path first algorithm based on the network database(s); 2) allocate that path/wavelength (often referred to as signaling the path; effectively telling the involved optical network devices how to configure their switch fabrics; e.g., using RSVP or CR-LDP based signaling with GMPLS). Steps 1 and 2 can be reversed.

There are generally three approaches to operating an optical network: 1) centralized static provisioning; 2) source based static provisioning; and 3) hybrid static provisioning. In centralized static provisioning, a separate centralized network management server maintains a network topology database and communicates with each of the optical network devices of a network. In response to some predefined demands for an optical circuit, the network management server finds the shortest path/wavelength. The network management server then causes the allocation of the path/wavelength and the configuring of the switch fabrics.

In source based static provisioning, each of the access nodes of the network performs the work of building/maintaining a network topology database. In response to some predefined demands for an optical circuit received by an access node, that node: 1) buffers the traffic as necessary; 2) finds the shortest path/wavelength; and 3) causes the allocation of the path/wavelength and the configuring of the switch fabrics.

In hybrid static provisioning, each of the nodes of the network use OSPF-TE to build network topology databases, and from there a network topology database is built and maintained in a centralized network management server. The network management server initiates a form of source based provisioning. This allows a network administrator to maintain control over provisioning of each lightpath provisioned.

One problem with existing optical networks is the network topology databases used and the manner in which they are built and maintained. Specifically, these monolithic physical topology databases (e.g., built with OSPF-TE) are very large because they must store all of the data to give a physical view of the network (not only connectivity at the link level, but connectivity at the lamda level because there are multiple lamdas per link and because different lamdas on a given link may provide different bandwidths; etc.). These large network databases are relatively time consuming to parse and require a relatively long time and a relatively large amount of node intercommunication to propagate changes. In addition, such network topology databases would become even larger if QoS type information needed to be recorded.

Another problem with existing optical network devices is there static, off-line nature of operation (e.g., using centralized static provisioning, source based static provisioning, hybrid static provisioning, etc.). More particularly, based upon a determination of the projected needs of the end node to end node connection through the optical network and the then existing state of the optical network (basically, a snapshot of the network parameters), an optical circuit is provisioned through the optical network over which the traffic is to travel. This optical circuit will be static in the sense that it will not be altered on the fly based upon current bandwidth requirements (demand changes), current status of the network, etc. Instead, this optical circuit will only be modified when it is re-provisioned (e.g., at the request of the customer to upgrade to a larger or smaller amount of bandwidth) and/or some form of protection switch based on a redundancy scheme.

Therefore, a given optical circuit is established at the maximum bandwidth believed to be required at any given point in time, and this maximum bandwidth is provisioned for that purpose. That is to say, a given customer is provisioned a fixed amount of bandwidth for all classes of traffic, whether that customer at any given point in time is using some, all or none of that bandwidth. Due to variations in the bandwidth requirements and/or the status of the network, bandwidth will go unused.

Thus, the optical layer is operated to provide point-to-point links, with no intelligence and no real time decision-making capabilities. In addition, the need for demands to be known in advance imposes difficulties for service creation and service provisioning. This results in an inefficient utilization of resources at the optical layer.

Furthermore, while there has been work to provide quality of service (QoS) at the IP layer and/or using MPLS, both of these protocols are carried over SONET; where SONET does not distinguish the types of traffic (does not provide QoS). Thus, typical optical control planes do no provide the ability to separate traffic into different classes based on service level requirements (i.e., they do not incorporate service level requirements of different types of traffic in lightpath calculations).

BRIEF SUMMARY

A selective distribution messaging scheme for an optical network is described. According to one embodiment of the invention, a wavelength division multiplexing optical network includes a number of nodes each having an optical cross connect and each having stored therein a database representing conversion free connectivity from that node to others of the nodes. In addition, each of the nodes employs a messaging scheme to propagate notification of changes in the optical network to others of the nodes to maintain their databases. The messaging scheme in each of the nodes transmits messages to only selected ones of the other nodes based at least in part on the conversion free connectivity to minimize the number of communications between nodes.

BRIEF DESCRIPTION OF THE DRAWINGS

The invention may best be understood by referring to the following description and accompanying drawings that are used to illustrate embodiments of the invention. In the drawings:

FIG. 3A illustrates service level A's conversion free service level topology for N1 of the optical network in FIG. 2 according to certain embodiments of the invention.

FIG. 3B illustrates service level B's conversion free service level topology for N1 of the optical network in FIG. 2 according to certain embodiments of the invention.

FIG. 3C illustrates service level C's conversion free service level topology for N1 of the optical network in FIG. 2 according to certain embodiments of the invention.

FIG. 5 is a flow diagram for building and maintaining network topology databases with a set of connectivity constraints according to certain embodiments of the invention.

FIG. 6 is a flow diagram illustrating the provisioning of lightpaths according to certain embodiments of the invention.

FIG. 8 is an exemplary data flow diagram of a distributed search based technique's formation of service level A's service level topology for N1 of the optical network in FIG. 2 according certain embodiments of the invention.

FIG. 9 is a flow diagram performed by each access node when joining an optical network according to embodiments of the invention.

FIG. 10 is a flow diagram illustrating a service level topology build-up for a single service level according to embodiments of the invention.

FIG. 17 is a flow diagram illustrating the operations performed by the access nodes connected by the link on which the channel is added/removed according to certain embodiments of the invention.

FIG. 18 is a flow diagram illustrating the operations performed by an access node responsive to receiving an update add/remove channel message according to certain embodiments of the invention.

FIG. 25 is a flow diagram illustrating the operations performed by an access node responsive to receiving a node addition message according to certain embodiments of the invention.

DETAILED DESCRIPTION

Figure 1:
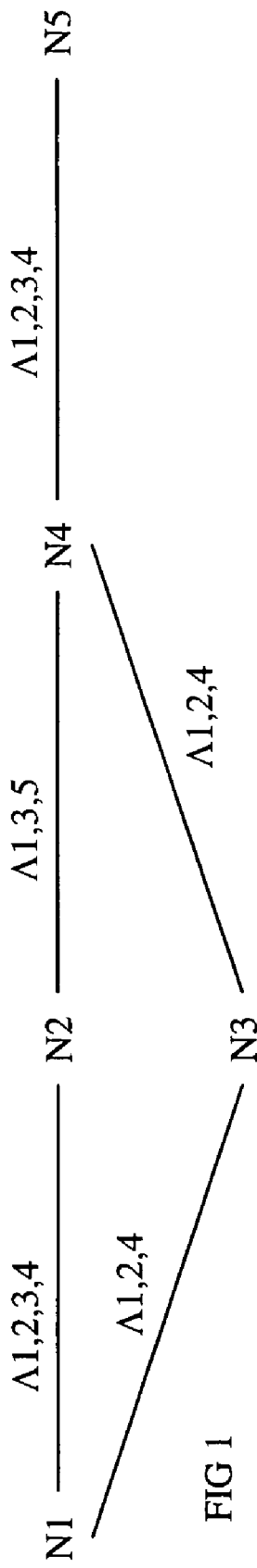
FIG. 1 is a block diagram illustrating an exemplary optical network according to one embodiment of the invention.

In the following description, numerous specific details are set forth (e.g., such as logic resource partitioning/sharing/duplication implementations, types and interrelationships of system components, and logic partitioning/integration choices). However, it is understood that embodiments of the invention may be practiced without these specific details. In other instances, well-known circuits, software instruction sequences, structures and techniques have not been shown in detail in order not to obscure the understanding of this description.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Overview

According to embodiments of the invention, a set of one or more connectivity constraints is imposed on the building/maintaining of network topology databases. As a result of the set of connectivity constraints, such network topology databases are smaller in comparison to network topology databases that represent all physical connectivity in the network. According to one aspect of the invention, the set of one or more connectivity constraints includes one or more QoS based criteria; thus, effectively dividing the optical network into QoS based logical network views that may be used to provision different wavelengths for different classes of traffic based on differing QoS requirements. According to another aspect of the invention, the set of one or more connectivity constraints includes a conversion free constraint; this allows for establishing conversion free optical circuits. According to another aspect of the invention, a distributed search based technique is used for building and maintaining network topology databases based on a set of connectivity constraints. According to another aspect of the invention, an optical network uses a source based scheme in which network topology databases, based on a set of connectivity constraints, are kept in access nodes. The reduced network topology database size (as compared to a physical network topology database) and distributed nature of this source based scheme allows for the provisioning of optical circuits in real-time (or on the fly; that is, the demands do not need to know ahead of time).

Since each of the above aspects is independent, different embodiments may implement different ones and/or combinations of the above aspects of the invention. For example, certain embodiments of the invention include in the set of connectivity constraints both QoS criteria and conversion free constraints. The network topology databases based on this set of connectivity constraints: 1) have reduced size over full physical connectivity network topology databases; 2) allow different traffic to be given different wavelengths based on QoS for different classes of traffic; and 3) allow for establishing conversion free optical circuits. While certain of these embodiments implement source based schemes and build/maintain the network topology databases using a distributed search based technique, others of these embodiments may use a different scheme and/or a different database building/maintaining technique.

Exemplary QoS Embodiments

Different embodiments of the invention may support different QoS criteria. For example, the QoS criteria may include bandwidth, bit error rate, optical signal to noise ratio, peak noise level, re-routing priority, etc. In other words, the QoS criteria may include any criteria that allows different wavelengths to be distinguished from each other based on quality of service. For a given wavelength on a given link, the values for the QoS criteria (the wavelength parameters) may be determined based on the configuration (e.g., the type of laser used) and/or by monitoring the light.

The QoS criteria is used to classify wavelengths on links into one of the set of supported service levels. In particular, for each of the QoS criteria, there is a service level parameter provided for each service level. The wavelength parameters of a given wavelength on a given link are compared against the service level parameters to classify that wavelength into one of the service levels.

Exemplary Network

In certain optical networks, different wavelengths in at least certain nodes have different wavelength parameters. For instance, a given optical network device may have different groups of wavelengths implemented to operate at different bandwidths (e.g., group A at OS-X, group B at OS-Y, and group C at OS-Z) and service level parameters that distinguish based on bandwidth. As a result, the optical network not only has a given interconnectivity at the physical link level (a physical topology), but also has a given interconnectivity for each service level (for each service level, a service level topology for the network and for each node), and a given interconnectivity for each conversion free service level (for each service level, a conversion free service level topology for each node).

FIG. 1 is a block diagram illustrating an exemplary optical network according to one embodiment of the invention. The optical network of FIG. 1 includes 5 access nodes labeled N1, N2, N3, N4, and N5. The ability to implement multiple lamdas on a single link is represented in simplified form by numbering the lamdas; lamdas having the same number are the same wavelength. FIG. 1 shows the numbered lamdas available on each optical link of the exemplary optical network. The term "available" when used in conjunction with a lamda number indicates that the node is capable of producing that wavelength; the terms allocated and unallocated are used to identify whether or not that available wavelength is currently provisioned. To describe the physical connectivity illustrated in FIG. 1, the format of node number: node number is used to indicate there is an optical link between those nodes; and node number: node number equals lamda number(s) indicates the wavelengths available on that link. Using this format, FIG. 1 shows: N2:N2=lamda 1, 2, 3, 4; N2:N4=lamda 1, 3, 5; N4:N5:=lamda 1, 2, 3, 4; N1:N3=lamda 1, 2, 4; and N3:N4=lamda 1, 2, 4.

It should be understood that the topology in FIG. 1 is exemplary, and that the invention can be used with any number of different topologies. In addition, while FIG. 1 illustrates different wavelengths being available on different optical links, it is understood that the same wavelengths may be available on all of the optical links. Furthermore, while specific wavelengths are identified as being available in FIG. 1, optical network devices may be implemented with lasers to allow them to generate a variety of different wavelengths and the invention is equally applicable to optical networks containing one or more such optical network devices. However, for purposes of illustration, embodiments of the invention will be described with reference to the wavelengths illustrated in FIG. 1. While the exemplary optical network in FIG. 1 is made up of access nodes, embodiments of the invention are equally applicable to optical networks that include pass through nodes.

Figure 2:
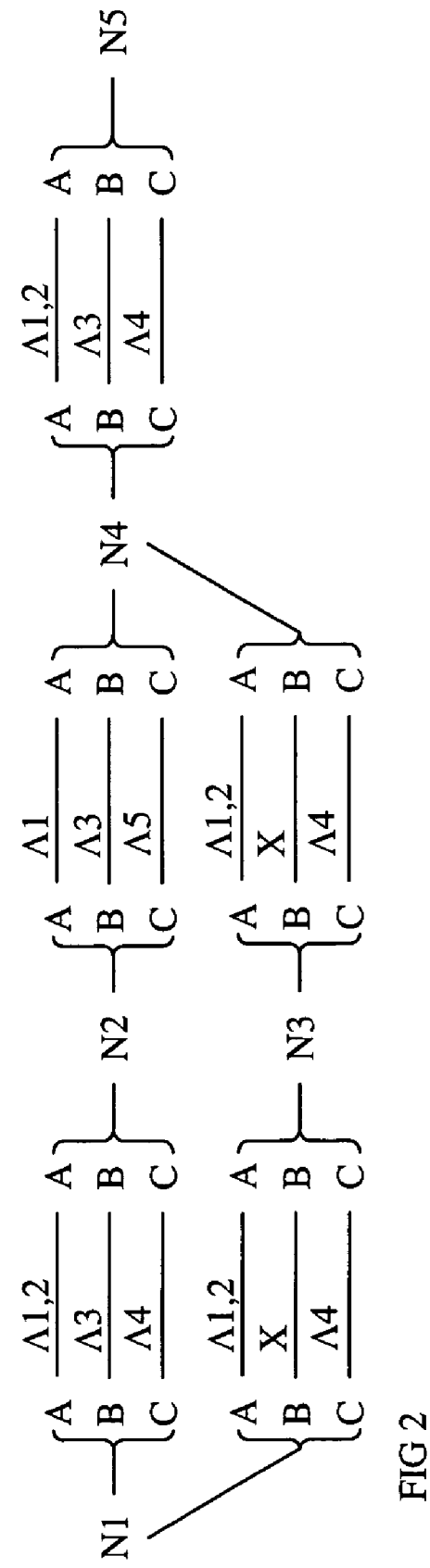
FIG. 2 is a block diagram illustrating exemplary QoS based logical network views of the exemplary optical network of FIG. 1 according to certain embodiments of the invention.

FIG. 2 is a block diagram illustrating exemplary QoS based logical network views of the exemplary optical network of FIG. 1 according to certain embodiments of the invention. In the example of FIG. 2, the set of supported service levels includes service levels A, B, and C. The wavelength parameters of each wavelength on each link have been compared against the service level parameters to classify each wavelength on each link into one of the service levels A, B, and C. To refer to a given service level, an S is placed in front of the service level label (SA, SB, SC). The format for identifying the wavelengths on a given link classified to a given service level is best provided by example. Specifically, SA (N1:N2)=lamda 1, 2 indicates that there is an optical link between N1 and N2, and that the wavelength parameters of lamda 1 and lamda 2 on that link qualify them for service level A (lamda 1 and 2 are referred to as the link service level channel set on link N1:N2 for service level A). Using this format, FIG. 2 illustrates the connectivity of service level A being: SA (N1:N2)=lamda 1, 2; SA (N2:N4)=lamda 1; SA (N4:N5)=lamda 1, 2; SA (N1:N3)=lamda 1, 2; SA (N3:N4)=lamda 1, 2. The service level connectivity for service level B is SB (N1:N2) =lamda 3; SB (N2:N4)=lamda 3; SB (N4:N5)=lamda 3; SB (N1:N3)=X; and SB (N3:N4)=X (where X indicates a null set). The connectivity of service level C is: SC (N1:N2) =lamda 4; SC (N2:N4)=lamda 5; SC (N4:N5)=lamda 4; SC (N1:N3)=lamda 4; and SC (N3:N4)=lamda 4.

Thus, while FIG. 1 illustrates the connectivity at the physical link level, FIG. 2 illustrates the connectivity for each service level (a service level topology for the network). Effectively, this service level node connectivity divides the optical network into QoS based logical network views as illustrated. Thus, for a first access node there are one or more paths across physical links to a second access node (physical topology). For any given one of these paths, there may be, on each of the link(s) making up that path, wavelengths at the same service level. For any given one of these paths, there may also be, on the link(s) making up that path, one or more of the same wavelengths at the same service level.

FIGS. 3A-C illustrate the conversion free service level topologies for service levels A-C for N1 of the optical network in FIG. 2 according to certain embodiments of the invention. Specifically, FIGS. 3A-C illustrate conversion free service level topologies in the form of trees having N1 as the root with branches representing links from node to node through the network. As used below, the phrase "path service level channel set" refers to the intersection set of the link service level channel sets on the links of the path. For example, the path service level channel set for the path N1:N2:N4:N5 at service level A is the intersection set of the link service level channel sets SA (N1:N2), SA (N2:N4), and SA (N4:N5).

FIG. 3A illustrates service level A's conversion free service level topology for N1 of the optical network in FIG. 2 according to certain embodiments of the invention. In FIG. 3A, N1 has branches to N2 and N3. With regard to the branch to N2, both lamda 1 and lamda 2 are available at service level A. Thus, for the path from N1 to N2, lamda 1 and lamda 2 make up the path service level channel set for service level A. Similarly, for the branch from N1 to N3, the path service level channel set includes lamda 1 and 2. It should be noted that for paths between adjacent nodes, the link service level channel set (e.g., SA(N1:N2)=lamda 1,2) is the same as the path service level channel set.

From each of N2 and N3, there is a branch to a different representation of N4. The branch from N2 to N4 represents the path N1:N2:N4. Since the link service level channel sets for N1:N2 and for N2:N4 respectively include lamda 1,2 and lamda 2, the intersection of these link service level channel sets includes only lamda 1 (the only conversion free N1:N2: N4 path uses lamda 1 on both N1:N2 and N2:N4). As such, the path service level channel set for the path N1:N2:N4 includes only lamda 1. In contrast, the branch from N3 to N4 represents the path N1:N3:N4. Since the intersection of the link service level channel sets for N1:N3 and N3:N4 includes lamda 1 and 2, the path service level channel set for the path N1:N3:N4 includes lamda 1 and 2.

The branch from N1 to N4, through N2, branches to: 1) N3 with path service level channel set lamda 1; and 2) N5 with path service level channel set lamda 1. The branch from N1 to N4, through N3, branches to: 1) N2 with path service channel set lamda 1; and 2) N5 with path service level channel set lamda 1, 2. It should be noted that even though the link service level channel set for N4:N5 includes lamda 1,2, the path service level channel set for N1:N2:N4:N5 includes only lamda 1 to remain conversion free. This is in contrast to the path service level channel set for N1:N3:N4:N5 which includes both lamda 1 and 2 because both are available on each link of this path.

FIG. 3B illustrates service level B's conversion free service level topology for N1 of the optical network in FIG. 2 according to certain embodiments of the invention. Since there is no lamda that qualifies for service level B on the link N1:N3, the tree of FIG. 3B does not have a branch from N1 to N3. However, there is a branch from N1 to N2, and the path service level channel set for the branch from N1 to N2 includes lamda 3. N2 has a branch to N4, which branch has as its path service level channel set lamda 3. Since there is no lamda qualifying for service level B on the link from N4 to N3, there is not a branch from N4 to N3. However, there is a branch to N5, and the path service level channel set for N1:N3:N4:N5 includes lamda 3.

FIG. 3C illustrates service level C's conversion free service level topology for N1 of the optical network in FIG. 2 according to certain embodiments of the invention. The tree of FIG. 3C has branches from N1 to: 1) N2 with path service level channel set lamda 4; and 2) N3 with path service level channel set lamba 4. There is no branch from N2 because wavelength conversion would be necessary (the link service level channel set for N2:N4 is lamda 5, whereas the path service level channel set for the path from N1 to N2 includes lamda 4). There is a branch from N3 to N4, which branch has as its path service level channel set lamda 4. There are branches from N4 to each of N2 and N5, both of which the path service level channel set includes lamda 4.

It should be understood that a given topology for a node may be service level based and/or conversion free based (depending on the set of connectivity constraints used). Thus, the phrase "service level topology" for a node indicates that at least a QoS based criteria is used, but it does not exclude the use of conversion free criteria (except where otherwise indicated herein); likewise, the phrase "conversion free topology" for a node indicates that at least a conversion free criteria is used, but it does no exclude the use of a QoS based criteria (except where otherwise indicated herein). In other words, to say a topology for a node is service level based does not indicate whether or not it is also conversion free based; to say a topology for a node is conversion free based does not indicate whether or not it is also service level based; but to say a topology for a node is conversion free based and QoS based indicates it must be both.

It should also be understood that if the set of connectivity constraints includes QoS based criteria, then there are service level topologies for the network and service level topologies (or conversion free service level topologies if a conversion free criteria is also used) for each node; if the set of connectivity constraints includes a conversion free criteria, then there is a conversion free topology (or a conversion free service level topology if QoS based criteria are also used) for each node. Different embodiments may store network topology databases that represent one or more of these different topologies in different devices depending on the implementation and the set of connectivity constraints used. For example, a centralized network management server may store network topology database(s) representing: service level topologies for the network, service level topologies for each node, one or more conversion free topologies for each node, and/or conversion free service level topologies for each node. As another example, each access node may store may store network topology database(s) representing: service level topologies for the network, service level topologies for that node, one or more conversion free topologies for that node, and/or conversion free service level topologies for that node. It should be understood that other configurations are within the scope of the invention.

Figure 4:
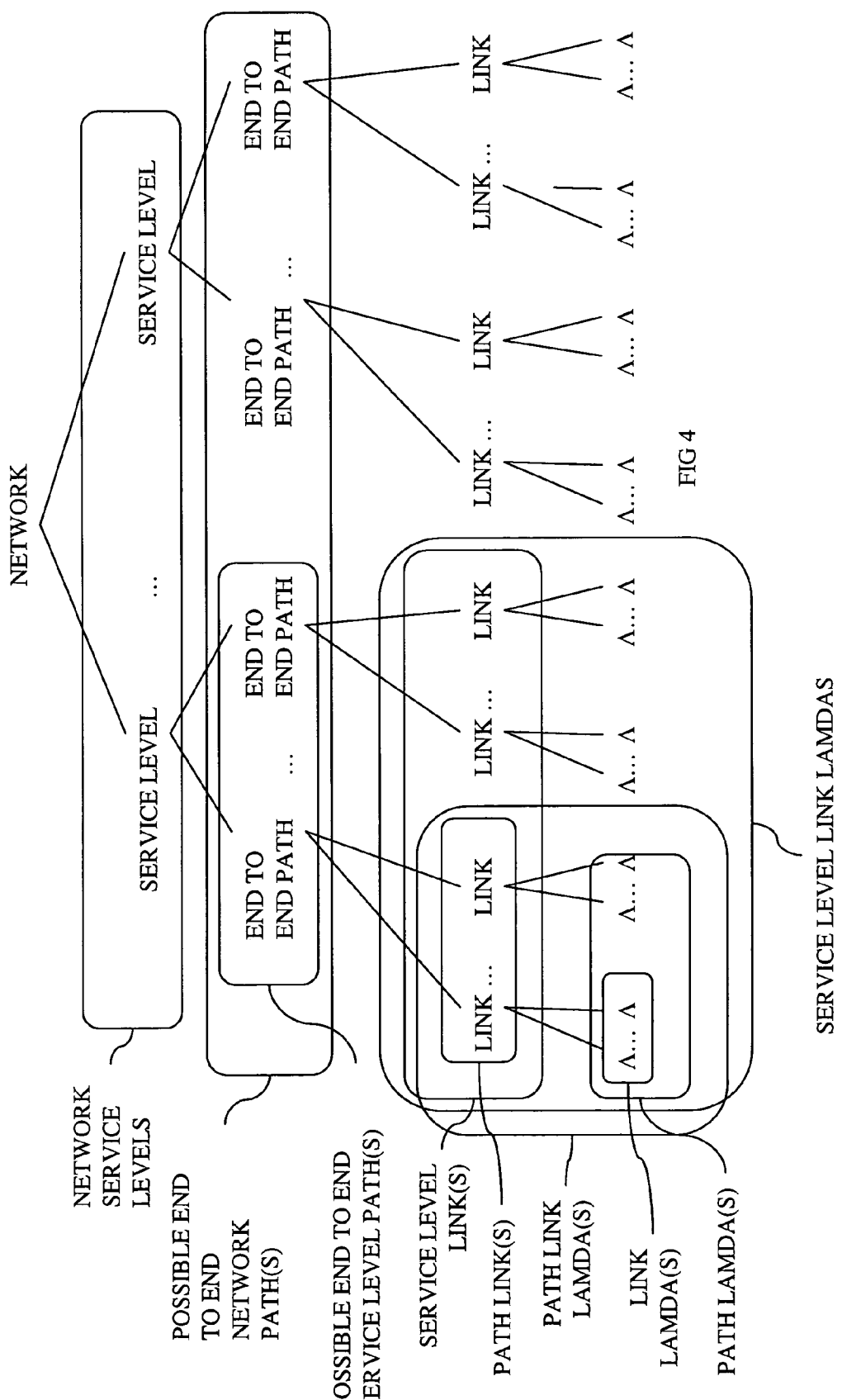
FIG. 4 is a block diagram illustrating a hierarchy of terms according to certain embodiments of the invention.

FIG. 4 is a block diagram illustrating a hierarchy of terms according to certain embodiments of the invention. The terms illustrated in FIG. 4 will be used with respect to certain embodiments of the invention described below. With reference to FIG. 4, the network is divided into a set of one or more service levels, each service level includes a set of zero or more possible end to end paths, each of these possible end to end paths includes a set of one or more links, and each link includes one or more available lamdas. The possible end to end paths of a given service level are referred to as the set of possible end to end service level paths (all paths that can be made between access nodes with the available lamdas at that service level). The union of the possible end to end service level paths of all the service levels is referred to as the set of possible end to end network paths. The links making up a given path are referred to as the set of path links, whereas the union of the links of all the possible end to end paths in a set of possible end to end service level paths is referred to as the set of service level links. The lamdas on a link of a possible end to end path of a service level are referred to as the link lamdas, whereas the union of the lamdas on the links of a possible end to end path of a service level are referred to as the path lamdas. The term service level link lamdas is used to refer to the links of the service level links and the lamdas thereon qualifying for that service level.

The hierarchy illustrated in FIG. 4 provides a framework for the set of connectivity constraints including one or more QoS based criteria that divide the network into service levels. When the set of one or more connectivity constraints also includes a conversion free constraint, the link lamdas of the links of a possible end to end path of a service level will all be the same. In other words, to provide a conversion free end to end path, the same lamda must be used on each link of the end to end path (that lamda must qualify for the same service level on each link of the path). In contrast, when the set of connectivity constraints does not include a conversion free constraint, the set of link lamdas may be different for different links of a possible end to end path of a service level.

Building and Maintaining Network Topology Databases with a Set of Connectivity Constraints While various techniques are described with reference to the building and maintaining of network topology databases with a set of connectivity constraints, it is understood that this is an aspect of the invention independent of other aspects of the invention; thus, the invention is not limited to the exemplary techniques of building and maintaining network topology databases with a set of connectivity constraints as described herein.

Overview

FIG. 5 is a flow diagram for building and maintaining network topology databases with a set of connectivity constraints according to certain embodiments of the invention. It should be understood that different ones of the blocks in FIG. 5 could be performed in a distributed and/or centralized manner as described in more detail below.

In block 505, the lamdas for each link are tracked and control passes to block 505. While certain embodiments of the invention use a link management protocol (LMP) to discover the adjacent links between nodes, alternative embodiments of the inventions may use other techniques (e.g., a manual input technique into each node, a manual input technique into a centralized network management server, etc.). In addition, while certain embodiments of the invention include a monitoring unit in one or more nodes of the network to measure wavelength parameters, alternative embodiments of the invention can use other techniques (e.g., periodic external testing devices, manual input into to each node of wavelength parameters, manual input of wavelength parameters into a centralized network management server, etc.).

As shown in block 510, a classification by QoS criteria is maintained for the lamdas of each link to determine the service level link lamdas and control flows to block 515. While in certain embodiments block 510 is performed by each node for its adjacent links, alternative embodiments of the invention use an alternative technique (e.g., a centralized network management server performs block 510 responsive to receiving wavelength parameter information as discussed with reference to block 505).

In block 515, the service level connectivity based on the conversion criteria is maintained for each service level. The service level connectivity that is maintained would include the available lamdas and the status as either allocated or unallocated. While in certain embodiments of the invention, the service level connectivity is built in distributed fashion and maintained in the access nodes, alternative embodiments of the invention use alternative techniques (e.g., perform such in a centralized network management server). The conversion criteria represents the number of wavelength conversions allowable for a given optical circuit. For example, if one of the connectivity constraints is a conversion free connectivity constraint, the number of wavelength conversions allowable is zero.

FIG. 6 is a flow diagram illustrating the provisioning of lightpaths according to certain embodiments of the invention. Different embodiments of the invention may implement such provisioning using a source based, centralized, hybrid, or other provisioning scheme.

In block 605, demand criteria is received. This demand criteria represents a request for a communication path (e.g., an optical circuit, a lightpath, a end-to-end uni-directional path, etc.). From block 605, control passes to block 610. In certain embodiments of the invention using a source based scheme, the demand criteria is received by an access node in the optical network. In other embodiments of the invention using a centralized network management server, such demands are received by the network management server directly from the requestor and/or from an access node in the optical network receiving the demand criteria. Of course, alternative embodiments of the invention can use other schemes and/or implement the schemes in other ways.

As shown in block 610, the service level is determined if it was not specified and control passes to block 615. For instance, while certain demand requests may come from entities aware of the service levels provided by the optical network, other entities making requests may not. These later entities may either not include any parameters or include parameters from which a service level can be determined.

In block 615, it is determined if there is an end to end path available at the determined service level. If there is a path available, control passes to block 620. Otherwise, control passes to block 625.

In block 620, a path and necessary lamda(s) are selected and allocated. The number of different wavelengths allocated will depend upon the wavelength conversion criteria (e.g., where a conversion free connectivity constraint is used, the same wavelength(s) will be used across each link of the selected path). Since this allocation affects the service level connectivity of block 515, block 515 is updated (e.g., some action is taken responsive to the allocation, periodic checks of the formed, etc.). In certain embodiments of the invention using a source based scheme, the source node performs block

620 by: 1) selecting the path and lamda(s); and 2) communicating with the other nodes of the optical network to allocate. In other embodiments of the invention in which a centralized network management server is used, block 620 is performed by a network management server performing the selection and communicating the allocation to the nodes on the path. Of course, alternative embodiments of the invention could implement other schemes in other ways.

In block 625, alternative action is taken depending upon the manner in which the optical network is administered. For instance, one or more of the following may be options: using a path from a higher service level, muxing two or more paths from lower service levels, allocating a single path from a lower service level, denying, allowing for an increased amount of wavelength conversions to occur, etc.

In addition to the need to allocate responsive to demand criteria, other operations are performed as part of administration of the optical network (e.g., deallocation, addition of a new wavelength, addition of a new link, failure/restoration of a wavelength, failure/restoration of a link, failure/restoration of a node, etc.). One or more blocks of FIG. 5 are updated responsive to these changes in order to provide for a current view the optical network. For instance, if a request was made to deallocate a path, the node that initiated the allocation (source) is instructed to deallocate the path and block 515 updates the service level connectivity of the service level, including the path that was deallocated. The addition of a wavelength, link or node (as well as the removal of a wavelength, link, or a node which was carrying no live traffic) results in an updating through blocks 505, 510 and 515. The loss of a wavelength, link or node is treated as a failure upon which some action is taken depending upon the redundancy scheme being implemented (different embodiments of the invention can use different redundancy schemes) or an elimination of that wavelength, link or node from the network.

It should also be noted that a request to change the demand criteria for a given provisioned service (e.g., a request to lower or raise the service level of a given provisioned service) is also addressed by certain embodiments of the invention. In particular, certain such embodiments respond to such requests by allocating a new path, and if successful and necessary, moving the traffic from the old path to the new allocated path and deallocating the old path. While different embodiments can perform the above using of variety of different techniques, embodiments using a source based scheme are discussed by way of example, and not by limitation, below.

Of course, one or more parts of an embodiment of the invention may be implemented using any combination of software, firmware, and/or hardware. Such software and/or firmware can be store and communicated (internally and with other access nodes over the network) using machine-readable media, such as machine-readable storage media (e.g., magnetic disks; optical disks; random access memory; read only memory; flash memory devices); and machine-readable communications media (e.g., electrical, optical, acoustical or other form of propagated signals (e.g., carrier waves, infrared signals, digital signals, etc.)); etc.

Exemplary Distributed Search Technique

Certain embodiments of the invention will now be described with reference to a distributed search based technique for building and maintaining in source nodes network topology databases based on a set of connectivity constraints that includes QoS criteria and conversion free constraints. However, it should be understood that alternative embodiments may use a distributed technique, but not build and maintain the service level topology databases in the source nodes (e.g., they may be built and maintained in a centralized network management server). In addition, while a distributed search based technique is described, alternative embodiments can use alternative techniques (e.g., a centralized technique). Similarly, alternative embodiments of the invention may not include the conversion free connectivity constraint, or relax it when necessary (e.g., when there is no conversion free end to end path at the requested service level).

Figure 7:
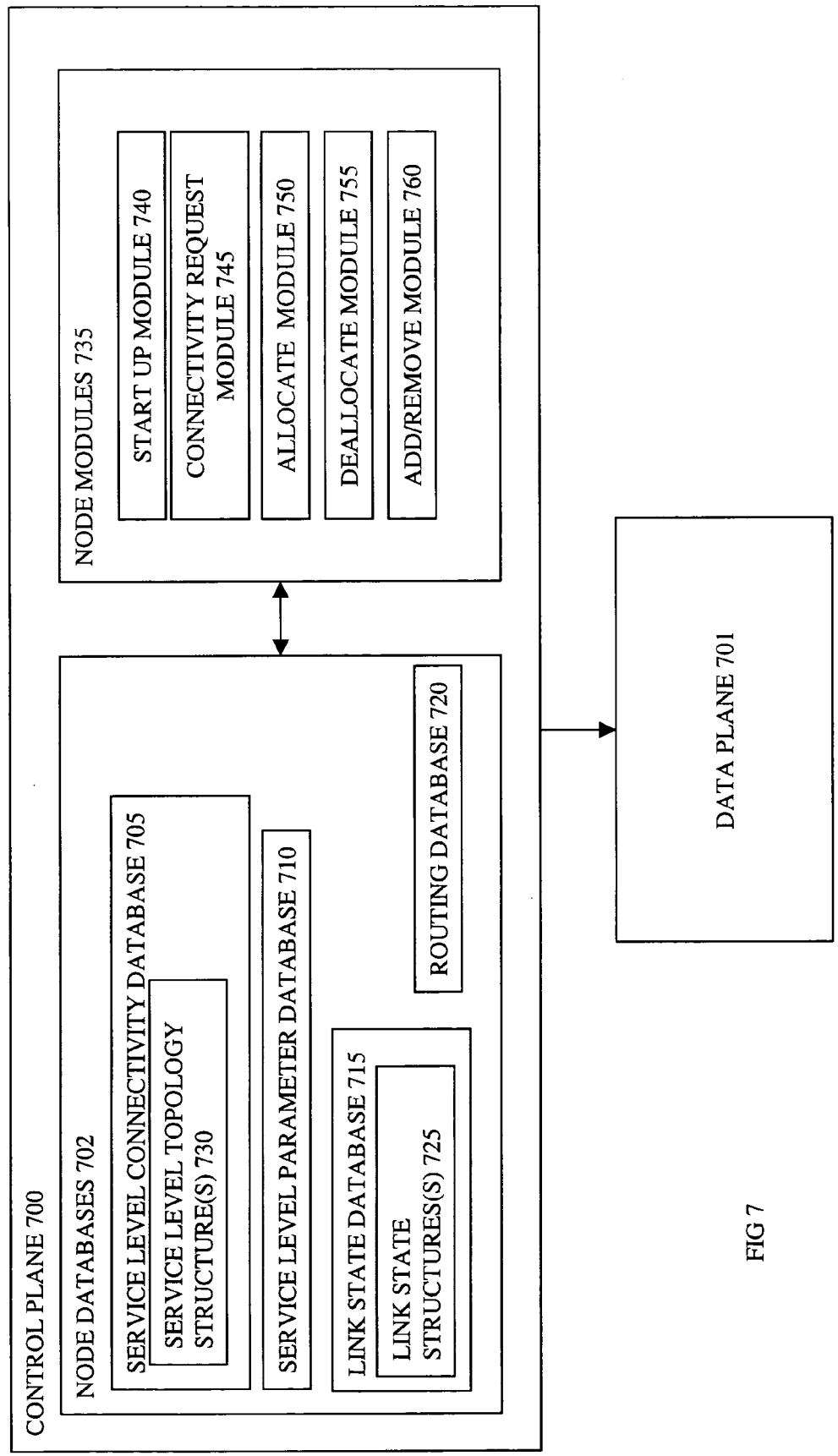
FIG. 7 is a block diagram illustrating an exemplary access node according to certain embodiments of the invention.

FIG. 7 is a block diagram illustrating an exemplary access node according to certain embodiments of the invention. FIG. 7 shows a control plane 700 coupled with a data plane 701. The control plane 701 includes node databases 702 coupled with node modules 735. Of course, the control plane 700 includes other items (e.g., protocols).

FIG. 7 shows the node databases 702 include a service level connectivity database 705, a service level parameter database 710, a link state database 715, and a routing database 720. The link state database 715 includes a set of one or more link state structures 725, one for each link connected to that node. While in certain embodiments these links are discovered through a link management protocol, alternative embodiments could use other techniques as described above. Each link state structure records a neighboring node, a port through which that neighboring node is connected (fiber links end up at a port on the node), available wavelengths on that link (through the port), as well as each wavelength's parameters.

The service level parameter database 710 stores the service level parameters previously discussed herein. The service level connectivity database includes a set of one or more service level topology structures 730, one for each service level. Each of these service level topology structures stores a representation of the conversion free service level topology for that node (e.g., see FIGS. 3A-C). In addition, the service level topology structure for each service level would track the allocated/unallocated status for each lamda in its topology. The status may not be limited to being allocated or unallocated. For example, a lamba that has failed due to a fiber cut, could be assigned a status of "broken". For embodiments in which only bi-directional paths can be allocated, the granularity for tracking allocated/unallocated status is simply the lamda level. However, in embodiments that allow for unidirectional path allocation, the granularity of allocated/unallocated status is a status for each direction for each lamda.

The node modules 735 includes a start up module 740, a connectivity request module 745, an allocate module 750, a Deallocate module 755, and an add/remove module 760. The operation of these modules in certain exemplary embodiments will be described respectively with respect to FIGS. 9-10, 11, 12-14, 15-16, and 17-18.

Start Up

Figure 11:
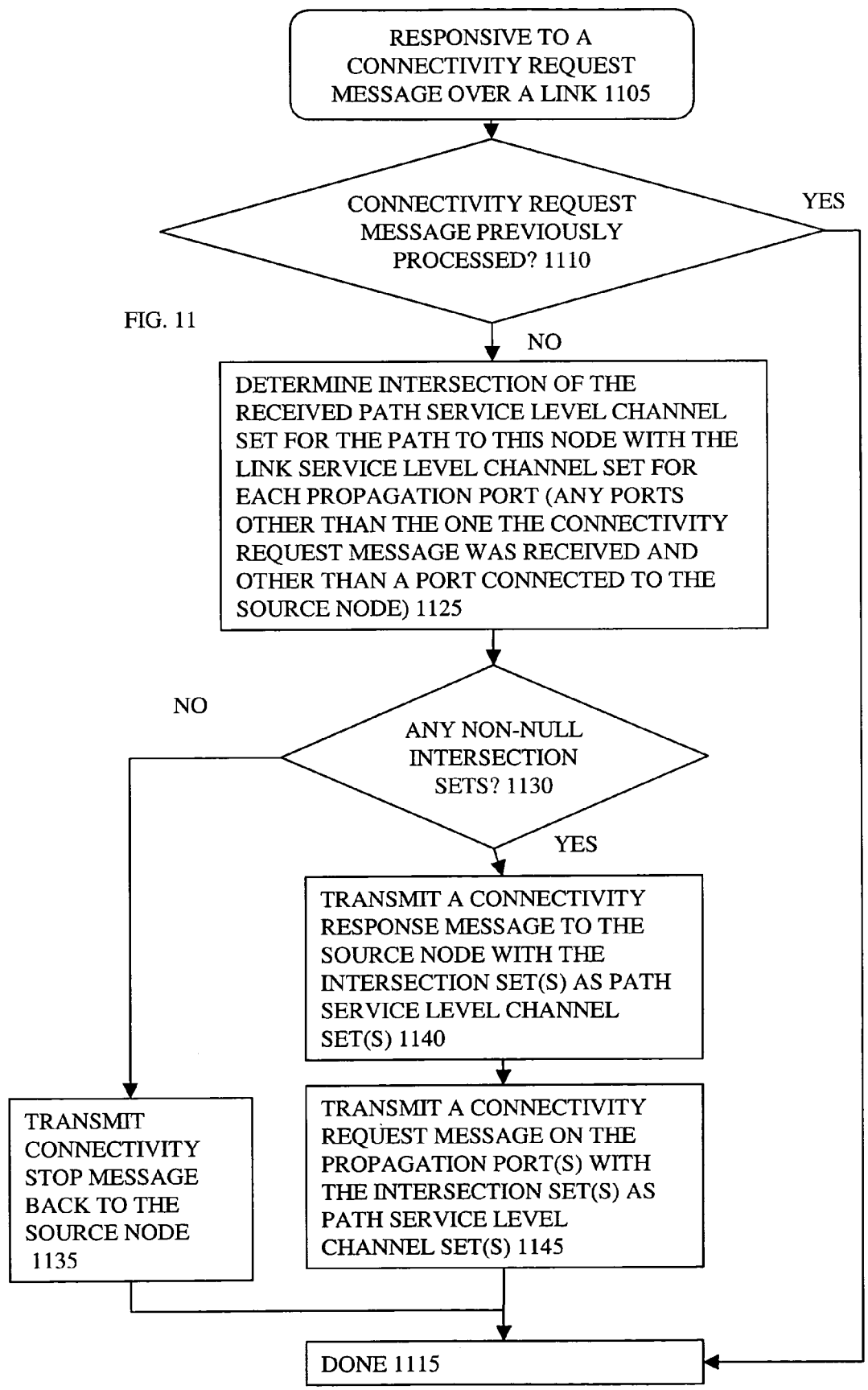
FIG. 11 is a flow diagram illustrating operations performed by nodes responsive to a connectivity request message received over a link according to certain embodiments of the invention.

FIG. 8 is an exemplary data flow diagram of a distributed search based technique's formation of service level A's service level topology for N1 of the optical network in FIG. 2 according certain embodiments of the invention. FIGS. 9-11 are flow diagrams for a distributed search based technique for building service level topologies, using a set of connectivity constraints including QoS criteria and conversion free criteria, in access nodes of an optical network. To provide an example, FIGS. 9-11 will be described with reference to the exemplary data flow diagram of FIG. 8. The operations of this and other flow diagrams will be described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

FIG. 9 is a flow diagram performed by each access node when joining an optical network according to embodiments of the invention. This flow diagram begins responsive to provision of wavelength parameters and service level parameters (905). With reference to the databases in FIG. 7, this would occur responsive to the populating of the service level parameter database 710 and the link state database 715. In certain embodiments, the service level parameter database is populated by the service provider through the network management interface.

In block 910, the number of service levels are determined and control passes to block 915. In certain embodiments of the invention, block 910 is performed by parsing the service level parameter database.

As shown in block 915, for each link to an adjacent node, the lamdas on that link are classified by the service level parameters to form link service level channel sets. With reference to FIG. 8, the link service level channel set for service level A for each node shown in FIG. 8 is illustrated by a box next to that node. From block 915, control passes to block 920.

In block 920, a service level topology build-up is initiated for each service level.

FIG. 10 is a flow diagram illustrating a service level topology build-up for a single service level according to embodiments of the invention. Thus, the flow of FIG. 10 would be performed for each service level responsive to block 920.

In block 1005, a service level topology structure is instantiated and populated with any qualifying adjacent nodes (adjacent nodes for which this source node has any non-null link service channel sets at this service level) and control passes to block 1010. With reference to FIG. 8, N1 would instantiate a service level topology structure 730 in its service level connectivity database 705. The service level topology structure would include at its root N1, as well as a branch to each of N2 and N3.

As shown, in block 1010, connectivity request message(s) are transmitted to the qualifying adjacent node(s) and control passes to block 1015. In certain embodiments of the invention, each connectivity request message includes a request ID, a source node ID, a forward node ID, a service level, and a computed set (a set of one or more paths, as well as the path service level channel set for each). While all of these fields are not needed for block 1010 (e.g., the source node is the same as the forward node, the needed information in the computed set is already known by the adjacent nodes), they are used as the search moves through the network (see FIG. 11). While in certain embodiments of the invention each connectivity request message includes the above noted fields, alternative embodiments could be implemented other ways (e.g., while full versions of connectivity request message could be used for FIG. 11, reduced versions of connectivity request messages could be used for block 1010; such reduced versions could include simply the request ID, source node ID, and service level). With respect to FIG. 8, N1 transmits a connectivity request message to each of N2 and N3 (the source node ID is N1, and the service level is A).

In block 1015, the service level topology structure is updated responsive to connectivity response messages received. The nodes transmitting such connectivity response messages and the contents of such connectivity response messages are described later herein with respect to FIG. 11. For instance, upon receipt of a connectivity response message, the received data is added to the appropriate branch of the appropriate service level topology structure. Upon receipt of a connectivity stop message, the path, identified in the received message, of the service level topology structure, for the service level identified in the received message, is complete. With respect to the example optical network described herein, the service level topology structure for service level A would represent something similar to that shown in FIG. 3A. For example, in certain embodiments of the invention a table is maintained with each of the available paths and its corresponding path service level channel set (e.g., each entry in the table store one of the available paths and its corresponding path service level channel set).

FIG. 11 is a flow diagram illustrating operations performed by nodes responsive to a connectivity request message received over a link according to certain embodiments of the invention. With respect of FIG. 8, node N2 receives the connectivity request message from node N1.

In block 1110, it is determined if the connectivity request message was previously processed. If so, control passes to block 1115; at which point this flow is complete. Otherwise, control passes to block 1120. A connectivity request message could have been previously processed because it was received from a different adjacent node. The determination as to whether a connectivity request message was previously processed could be performed in a number of different ways. For example, in an embodiment in which connectivity request messages include the request ID and the source node ID, this determination can be made by comparing this request ID and source node ID of the current connectivity request message to a log of such for previous connectivity request messages.

As shown in block 1125, the intersection of the received path service level channel set for the path to this node with the link service level channel set for each propagation port is determined. From block 1125, control passes to block 1130. The phrase propagation port is used to refer to any ports other than: 1) the one the connectivity request message was received on; and 2) a port connected to the source node (i.e., the source node is adjacent to this node). In certain embodiments of the invention, the propagation ports are determined by selecting links from the link state database that are not connected to the forward node ID and source node ID identified in the connectivity request message. With reference to FIG. 8, since N2 received the connectivity request over the link to N1 and since N1 is the source node, N2 would select the port through which a link to node N4 is connected. N2 would then determine the intersection of the path service level channel set for N1:N2 with the link service level channel set for N2:N4. This intersection set is the path service level channel set for N1:N2:N4 and is included in the computed set (path service level channel sets are shown in FIG. 8 by dashed boxes, such as the one under N2). Specifically, N2 determines the intersection of the path service level channel set (SA (N1:N2)=lamda 1, 2) and the link service level channel set (SA (N2:N4)=lamda 1) to be lamda 1 (which is also represented herein using the format SA (N1:N2:N4)=lamda 1).

Thus, the computed set represents the intersection of the preceding link service level channel sets for the path the connectivity request message has traveled. In the case of block 1010, the computed set is the same as the link service level channel set for the link over which the connectivity request message was transmitted. However, as the connectivity request message gets retransmitted to other nodes, the computed set will represent the paths traveled and the intersection set for each such path.

In block 1130, it is determined if there are any non-null intersection sets. If so, control passes to block 1140. Otherwise, control passes to block 1135.

As shown in block 1140, a connectivity response message, with the intersection set(s) as path service level channel set(s), is transmitted to the source node and control passes to block 1145. In certain embodiments of the invention, each connectivity response message includes the service level, request ID, response node ID, and computed set. With regard to node N2, N2 would transmit to N1 a connectivity response message including as the computed set N1:N2:N4, lamda 1.

In block 1145, a connectivity request message, with the intersection set(s) as path service level channel set(s), is transmitted on the propagation ports and control passes to block 1115. With regard to node N2, N2 would transmit to N4 a connectivity request message. With regard to embodiments of the invention in which connectivity request messages include request ID, a source node ID, a forward node ID, a service level, and a computed set, N2 would respectively fill these fields with the request ID, N1, N2, A, and the computed set N1:N2:N4, lamda 1.

In block 1135, a connectivity stop message is transmitted back to the source node and control passes to block 1115. In certain embodiments, such a connectivity stop message includes the source node ID.

To complete the example of FIG. 8, responsive to the connectivity request message from N1, N3 determines the intersection set to N4 for service level A. N3 transmits this intersection set back to N1 in a connectivity response message, as well as to N4 in a connectivity request message. Meanwhile, responsive to N2's connectivity request message, N4 determines intersection sets to N3 and N5 for service level A. N4 transmits these back to N1 in a connectivity response message and transmits these to N3 and N5 in connectivity request messages. Responsive to N4's connectivity request messages: 1) N3 does nothing because it has seen this request ID before (the above connectivity request message from N1); and 2) N5 transmits back to N1 a connectivity stop message. Responsive to N3's connectivity request message, N4 does nothing because it has seen this request ID before (the above connectivity request message from N2).

Allocate

Figure 12:
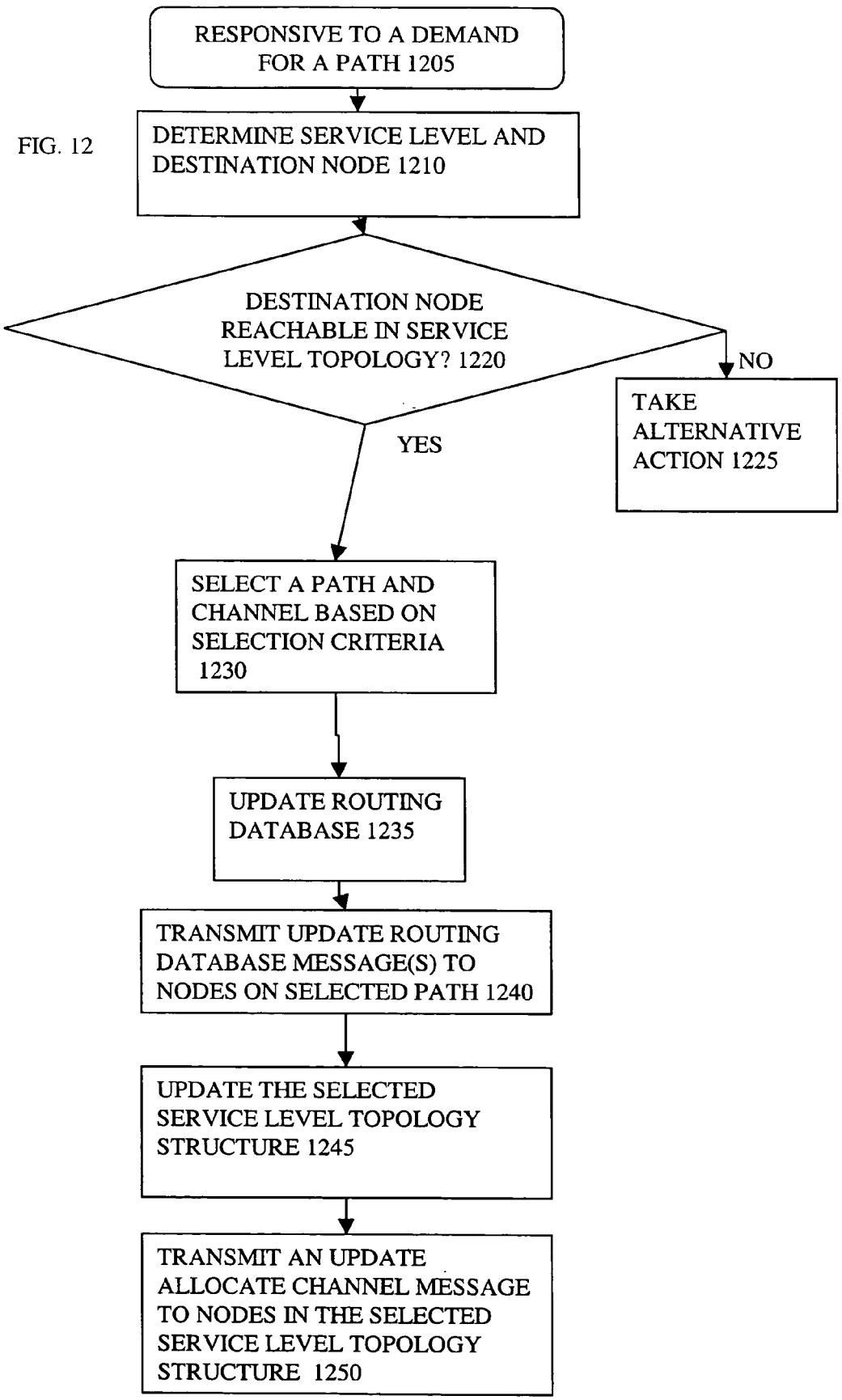
FIG. 12 is the flow diagram illustrating operations performed by an access node to allocate a path according to certain embodiments of the invention.
Figure 13:
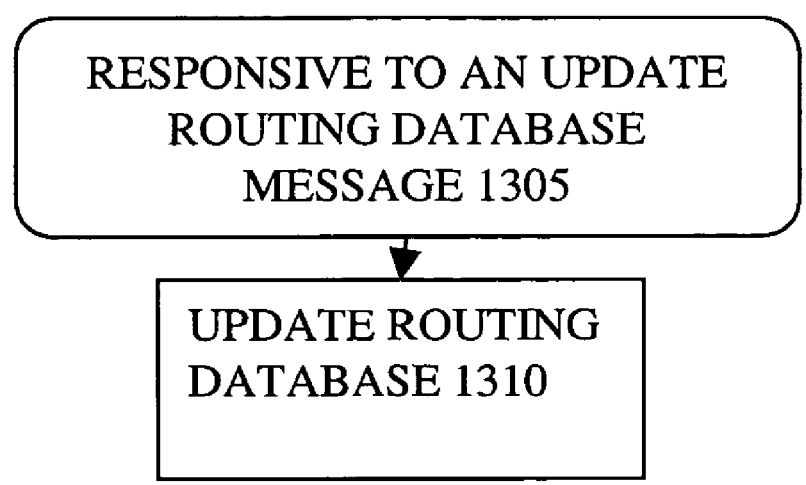
FIG. 13 is a flow diagram illustrating operations performed by an access node responsive to an update routing database message according to certain embodiments of the invention.
Figure 14:
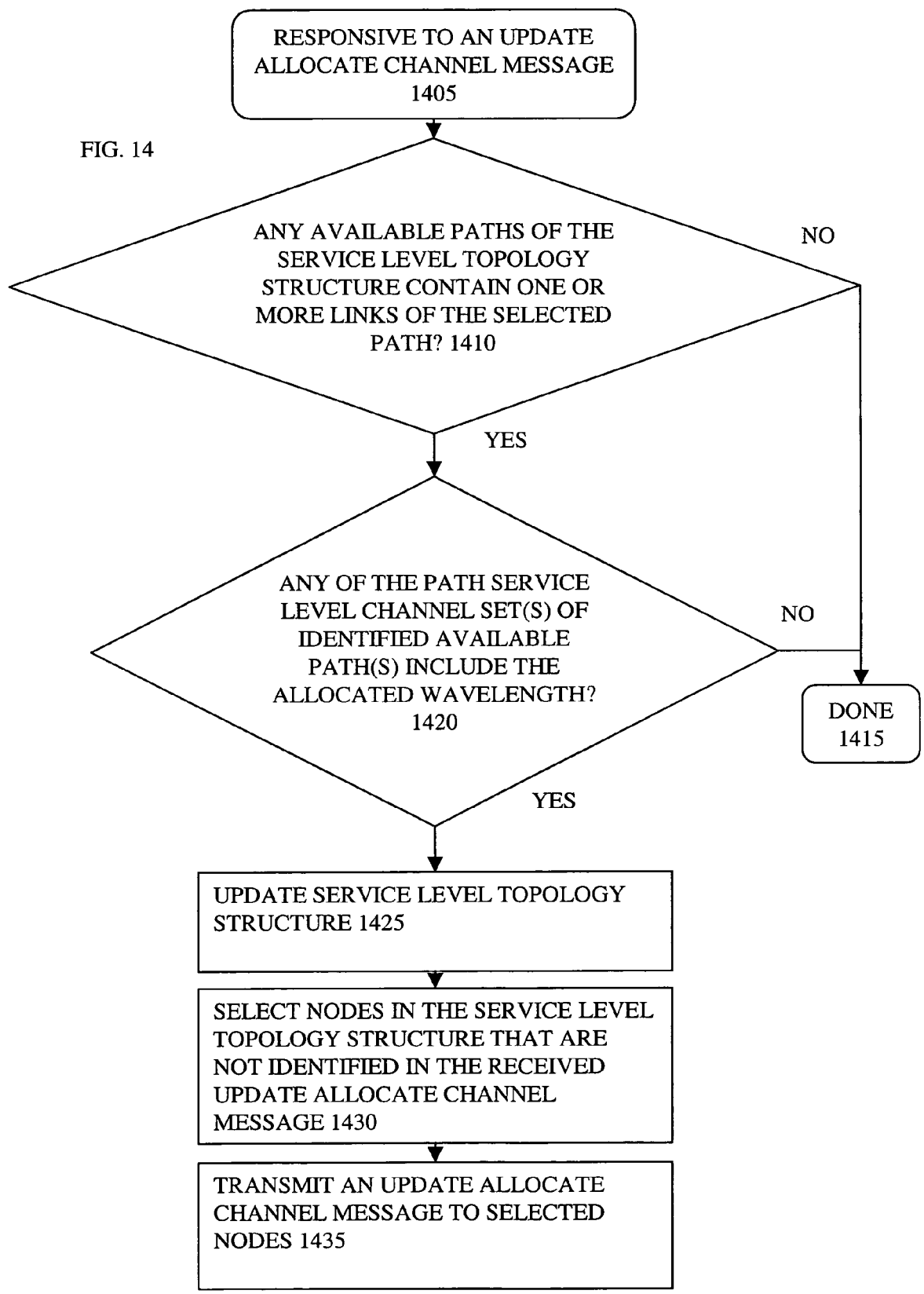
FIG. 14 is a flow diagram illustrating operations performed by an access node responsive to an update allocate channel message according to certain embodiments of the invention.

FIGS. 12-14 are flow diagrams illustrating the allocation of a path according to certain embodiments of the invention. FIG. 12 is the flow diagram illustrating operations performed by an access node to allocate a path according to certain embodiments of the invention. The operations in FIG. 12 result in: 1) update routing database message(s) being sent to the nodes along the selected path being allocated; and 2) update allocate channel message(s) being sent to certain nodes. FIG. 13 is a flow diagram illustrating the operations performed by an access node responsive to an update routing database message according to certain embodiments of the invention; FIG. 14 is a flow diagram illustrating the operations performed by an access node responsive to an update allocate channel message according to certain embodiments of the invention.

With reference to FIG. 12, an access node (which will act as the source node) receives a demand for a path and control passes to block 1210. There are various mechanisms through which such a demand for a path could be received by the access node. For instance, in certain embodiments of the invention OIF-UNI and/or OIF-NNI interfacing protocols are used to communicate with nodes and domains, respectively, which do not support GMPLS or MPLS.

In block 1210, the service level and destination node for the demand are determined and control passes to block 1220. Block 1210 may be performed in a similar manner to block 605 of FIG. 6.

As shown in block 1220, it is determined if there is a path available at that service level. If not, control passes to block 1225. Otherwise, control passes to block 1230. Block 1220 can be implemented in a variety of ways. With regard to the exemplary embodiment of FIG. 7, the service level topology structure is parsed to determine if the destination node is reachable and there is an unallocated lamda available. While in certain embodiments, the service level topology structure is parsed responsive to a demand, alternative embodiments of the invention generate derivative structures that are faster to parse and/or pre-select (and may pre-allocate) various paths (e.g., see discussion later herein). Block 1220 is similar to block 615 of FIG. 6.

As shown in block 1225, alternative action is taken. Block 1225 is similar to block 625, and the various alternatives discussed there are equally applicable here.

In block 1230, a path and channel are selected based upon selection criteria and control passes to block 1235. In certain embodiments, the selection of path and channel includes the selection of a node: channel: port sequence for the path (it should be noted that where, as here, a conversion-free connectivity constraint is used, a single channel is used). Various embodiments can use different selection criteria for selecting the path and channel. For instance, certain embodiments of the invention utilize load balancing as described later herein. It should also be understood that various path calculation techniques may be used, including Djikstra's algorithm.

As shown in block 1235, the routing database is updated and control passes to block 1240. The routing database is updated to reflect the connection of the incoming port identified by the demand in block 1205 with the outgoing channel: port of the selected path. In certain embodiments, responsive to the updating the routing database, well-known techniques are used to modify the data plane of the access node accordingly (of course, alternative embodiments may be implemented to modify the data plane first and/or through a different mechanism). Whether a path in the opposite direction is also allocated depends on whether the implementation requires all paths to be bi-directional and/or a bi-directional path was requested in the demand.

In block 1240, update routing database message(s) are transmitted to nodes on the selected path and control passes to block 1245. In certain embodiments of the invention, each update routing database message includes an update ID, as well as the channel and port information relevant to the recipient node of the message.

As shown in block 1245, the selected service level topology structure is updated and control passes to block 1250. In particular, the selected channel is marked as allocated in all path service level channel sets down stream of a link in the selected path. In other words, the selected channel is marked allocated in the path service level channel set(s) of the available path(s) that include one or more links of the selected path. To provide an example, assume the path N1: N2: N4 is allocated with lamda 1 in FIG. 2. With reference to FIG. 3A, lamda 1 would need to be marked as allocated from the path service level channel set of N1: N2, N1: N2: N4, N1: N2: N4: N3, N1: N2: N4: N5, and N1: N3: N4: N2 because each contains one or more links on the selected path.

In block 1250, an update allocate channel message is transmitted to nodes in the selected service level topology structure. In certain embodiments, each update allocate channel message includes an update ID, a service level, a path, an allocated channel, and a sent-to-set. The sent-to-set represents the set of nodes to which the message is going to be sent. While the nodes to which the message is to be sent can be determined in a variety of ways, certain embodiments of the invention parse the service level topology structure to identify all of the nodes (removing duplicates) apart from the source node.

FIG. 13 is a flow diagram illustrating operations performed by an access node responsive to an update routing database message according to certain embodiments of the invention. In block 1310, the routing database is updated. The receiving node's routing database is updated to reflect the connection identified in the received message. In certain embodiments, responsive to the updating of the routing database, well-known techniques are used to modify the data plane of the access node accordingly (of course, alternative embodiments may be implemented to modify the data plane first and/or through a different mechanism—e.g., signaling).

Block 1310 is performed in a similar fashion to block 1235 of FIG. 12.

FIG. 14 is a flow diagram illustrating operations performed by an access node responsive to an update allocate channel message according to certain embodiments of the invention. In block 1410, it is determined if any of the available paths of the service level topology structure for the service level of the allocated path contain one or more links of the selected path. If not, control passes to block 1415 where the flow diagram ends. If so, control passes to block 1420. In certain embodiments of the invention, block 1410 is performed by parsing the appropriate service level topology structure to determine if any links on the selected path are represented therein.

As shown in block 1420, it is determined if any of the path service level channel set(s) of the available paths identified in block 1410 include the allocated wavelength. If not, control passes to block 1415. Otherwise, control passes to block 1425. In certain embodiments of the invention, block 1420 is performed by parsing the path service level channel set(s) of the identified path(s) to determine if the allocated wavelength is present.

As shown in block 1425, the selected service level topology structure is updated and control passes to 1430. In certain embodiments of the invention, block 1425 is performed by marking the allocated wavelength as allocated in the path service level channel set(s) identified in block 1420.

As shown in block 1430, nodes are selected from the service level topology structure that are not identified in the received allocate channel message and control passes to block 1435. In certain embodiments of the invention, block 1430 is performed by: 1) identifying as "new set" all of the nodes in the service level topology structure that are not in the sent-to-set in the received update allocate channel message (1405); and 2) forming an updated version of the sent-to-set that is the union of the new set and the sent-to set in the received update allocate channel message (1405).

In block 1435, an update allocated channel message is transmitted to the selected nodes. In certain embodiments of the invention, block 1435 is performed by transmitting an update allocate channel message with the updated sent-to-set to all nodes in the new set of block 1430.

Deallocate

Figure 15:
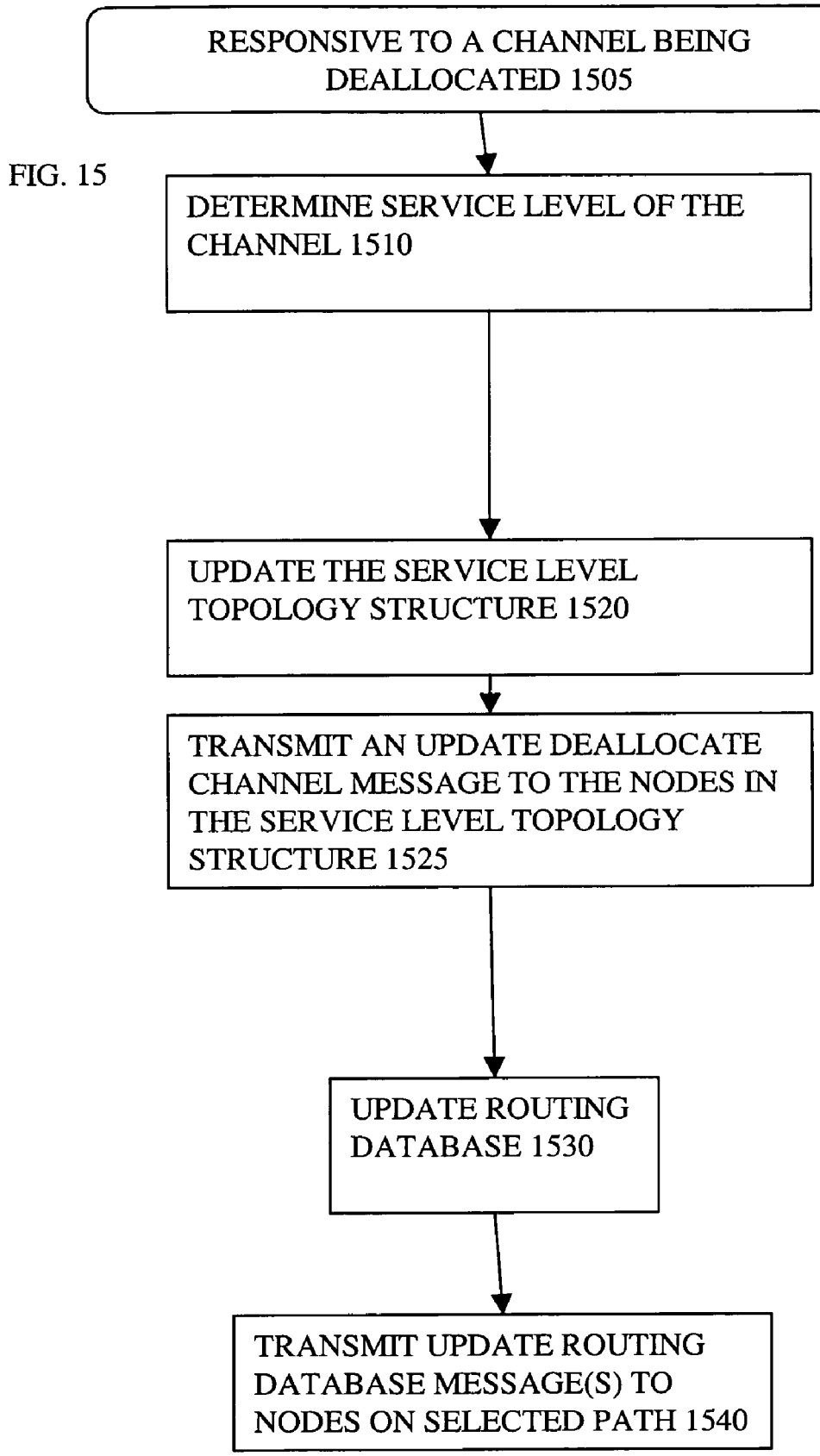
FIG. 15 is a flow diagram illustrating operations performed by the source node of a path responsive to that path being deallocated according to certain embodiments of the invention.
Figure 16:
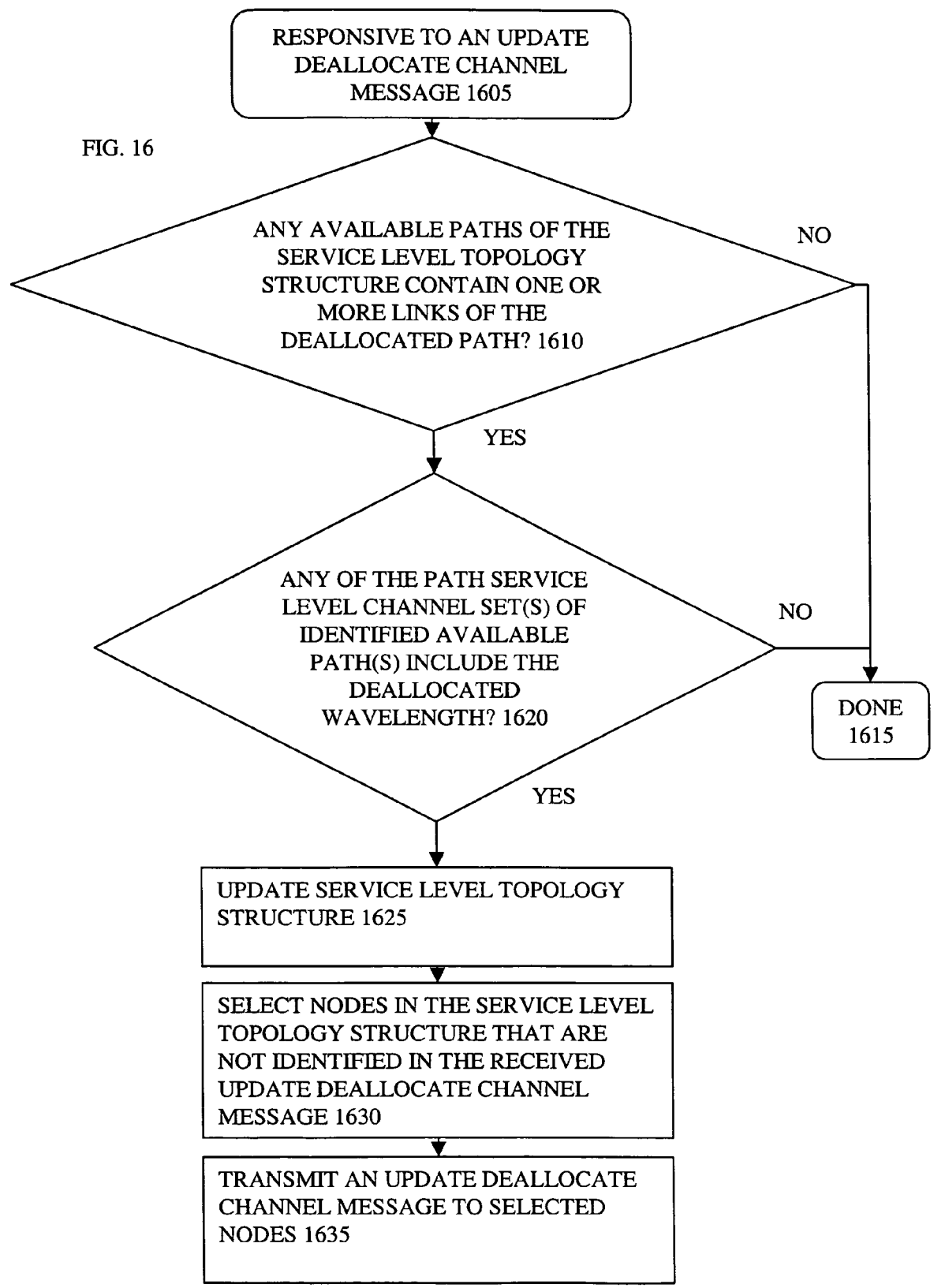
FIG. 16 is a flow diagram illustrating operations performed by access nodes responsive to an update deallocate channel message according to certain embodiments of the invention.

Responsive to a request to deallocate a channel (e.g., communication received by the source node for the path using the channel), signaling is used to disconnect the existing cross connects on the path. FIG. 15 is a flow diagram illustrating operations performed by the source node of a path responsive to that path being deallocated according to certain embodiments of the invention. As part of the flow diagram in FIG. 15, the source node of the path transmits update deallocate channel message(s) to certain other nodes. FIG. 16 is a flow diagram illustrating the operations performed by access nodes responsive to receiving an update deallocate channel message according to certain embodiments of the invention.

In block 1510, the service level of the channel being deallocated is determined and control passes to block 1515. In certain embodiments, the service level is determined by parsing the link state database to locate the channel being deallocated.

As shown in block 1520, the service level topology structure is updated and control passes to block 1525. Block 1520 is performed in a similar fashion to block 1245, with the exception that the channel is marked unallocated. In particular, the deallocated channel is marked as unallocated in all path service level channel sets down stream of a link in the deallocated path. In other words, the deallocated channel is marked unallocated in the path service level channel set(s) of the available path(s) that include one or more links of the deallocated path. To provide an example, assume the path N1: N2: N4 is deallocated with lamda 1 in FIG. 2. With reference to FIG. 3A, lamda 1 would need to be marked as unallocated from the path service level channel set of N1: N2, N1: N2: N4, N1: N2: N4: N3, N1: N2: N4: N5, and N1: N3: N4: N2 because each contains one or more links on the deallocated path.

As shown in block 1525, an update deallocate channel message is transmitted to nodes in the service level topology structure and control passes to block 1530. The set of nodes to which this message is sent is referred to the sent-to-set. In certain embodiments of the invention, the update deallocate channel message includes the source node ID, the adjacent node ID, the path, the channel deallocated, the update ID, the service level, and the sent-to-set. While the nodes to which the message is to be sent can be determined in a variety of ways, certain embodiments of the invention parse the service level topology structure to identify all of the nodes (removing duplicates) apart from the source node.

As shown in block 1530, the routing database is updated and control passes to block 1540. With reference to the exemplary embodiment of FIG. 7, the routing database 720 would be modified to remove the connection of the deallocated channel. Whether a path in the opposite direction is also deallocated depends on whether the implementation requires all paths to be bi-directional and/or the path being deallocated was bi-directional.

In block 1540, update routing database message(s) are transmitted to nodes on the selected path. In certain embodiments of the invention, each update routing database message includes an update ID, as well as the channel and port information relevant to the recipient node of the message. A recipient access node responds to the receipt of such a message by modifying its routing database to reflect the disconnection of the incoming channel:port and the outgoing channel: port as specified in the message.

In this manner, the nodes along the path are updated to reflect the deallocation; in addition, update deallocate channel messages have been sent to initiate any necessary updating at such nodes.

FIG. 16 is a flow diagram illustrating operations performed by access nodes responsive to an update deallocate channel message according to certain embodiments of the invention. In block 1610, it is determined if any of the available paths of the service level topology structure for the service level of the deallocated path contain one or more links of the deallocated path. If not, control passes to block 1615 where the flow diagram ends. If so, control passes to block 1620. In certain embodiments of the invention, block 1610 is performed by parsing the appropriate service level topology structure to determine if any links on the deallocated path are represented therein.

As shown in block 1620, it is determined if any of the path service level channel set(s) of the available paths identified in block 1610 include the deallocated wavelength. If not, control passes to block 1615. Otherwise, control passes to block 1625. In certain embodiments of the invention, block 1620 is performed by parsing the path service level channel set(s) of the identified path(s) to determine if the allocated wavelength is present.

As shown in block 1625, the selected service level topology structure is updated and control passes to 1630. In certain embodiments of the invention, block 1625 is performed by marking the deallocated wavelength as unallocated in the path service level channel set(s) identified in block 1620.

In block 1630, the nodes in the service level topology structure that are not identified in the received update deallocate channel message are selected and control passes to block 1635. In certain embodiments of the invention, block 1630 is performed by: 1) identifying as "new set" all nodes in the service level topology structure that are not in the sent-to-set in the received update deallocate channel message (1605); and 2) forming an updated version of the sent-to-set that is the union of the new set and the sent-to-set in the received update deallocate channel message (1605).

As shown in block 1635, an update deallocate channel message is sent to the selected nodes and control passes to block 1615. In certain embodiments of the invention, this update deallocate channel message includes the new sent-to-set determined in block 1630 as opposed to the sent-to-set in the received update deallocate channel message (1605).

Dynamic Provisioning

As previously noted, a request to change the demand criteria for a given provisioned service (e.g., a request to lower or raise the service level of a given provisioned service) is also addressed by certain embodiments of the invention. In particular, certain such embodiments respond to such requests by allocating a new path, and if successful and necessary, moving the traffic from the old path to the new allocated path and de-allocating the old path.

The reduced network topology database size (as compared to a physical network topology database) and distributed nature of this source based scheme allows for the provisioning of optical circuits in real-time (or on the fly; that is, the demands do not need to know ahead of time). Furthermore, the QoS based criteria allows for differentiation of traffic types at the optical layer. Thus, for example, a given service to a customer can be at a higher service level during the day, and dropped down to the lower service level at night. Of course, such switches can occur even more often.

In addition, implementations can push SONET out to the edge of the network. For instance, as opposed to carrying stacks of network layers (IP over ATM over SONET) over optical, network layers can be directly carried over optical (e.g., IP or ATM, or SONET).

Add and Remove Channels

FIGS. 17 and 18 are flow diagrams illustrating operations performed when either a channel is added or a channel without live traffic is removed according to certain embodiments of the invention. The operations of FIG. 17 are performed by the access nodes connected by the link on which the channel is added or removed (also referred to as the adjoining nodes or the access nodes made adjacent by that link). As part of these operations, an update add/remove channel message is transmitted to certain other nodes. The operations of FIG. 18 are performed by an access node responsive to such an update add/remove channel message.

FIG. 17 is a flow diagram illustrating the operations performed by the access nodes connected by the link on which the channel is added/removed according to certain embodiments of the invention. In block 1710, the service level of the channel is determined and control passes to block 1715. When a channel is being added, block 1710 is performed, according to certain embodiments of the invention, by comparing that channel's wavelength parameters to the service level parameters to classify it into one of the service levels. When a channel is being removed, block 1710 is performed, according to certain embodiments of the invention, by accessing the link state database of FIG. 7.

As shown in block 1715, a connectivity request message is transmitted on the link carrying the channel and control passes to blocks 1720 and 1725. Block 1715 is performed in a similar manner to block 1515 of FIG. 15.

In block 1720, the service level topology structure is updated responsive to connectivity response messages received. In certain embodiments of the invention, block 1720 is performed in a similar manner to block 1015 of FIG. 10 with a variation. Since certain data already exists in the service level topology structure, the received data in the connectivity response messages is used to update (add, remove, and/or alter) the existing service level topology structure. In the case of a channel removal, in certain embodiments of the invention, the channel on each path with the link may be either removed from the service level topology structure or marked broken.

As shown in block 1725, an update add/remove channel message is transmitted to the nodes in the service level topology structure that are not on the link with the channel. In certain embodiments of the invention, each update add/remove channel message includes an update ID, the wavelength, whether this is an addition or removal, the source node ID, the source adjacent node ID, the service level, and the sent-to-set. The source node and the source adjacent node identified are the access nodes connected by the link on which the channel was added/removed. The sent-to-set includes the nodes in the service level topology structure that the message is sent to in block 1725 (all nodes in the service level topology structure other than the source node and source adjacent node).

FIG. 18 is a flow diagram illustrating the operations performed by an access node responsive to receiving an update add/remove channel message according to certain embodiments of the invention. As shown in block 1810, it is determined if the service level topology structure includes path(s) with the link to which the channel was added/removed. If not, control passes to block 1815 where the flow diagram ends. If so, control passes to block 1820. In certain embodiments of the invention, block 1810 is performed by searching the service level topology structure (for the service level identified in the received update add/remove channel message) for the link identified in the received update add/remove channel message (based on the source node ID and source adjacent node ID contained therein).

In block 1820, connectivity request message(s) are transmitted on link(s) of these paths and control passes to blocks 1825 and 1830. In particular, the access node transmits a connectivity request message on each of its links that are part of these paths.

In block 1825, the service level topology structure is updated responsive to connectivity response messages received. Block 1825 is performed in a similar fashion to block 1720 of FIG. 17.

As shown in block 1830, nodes are selected from the service level topology structure that are not identified in the received update add/remove channel message and control passes to block 1835. In certain embodiments of the invention, block 1830 is performed by: 1) identifying as "new set" all of the nodes in the service level topology structure that are not in the sent-to-set in the received update add/remove channel message (1805); and 2) forming an updated version of the sent-to-set that is the union of the new set and the sent-to set in the received update add/remove channel message (1805).

In block 1835, an update add/remove channel message is transmitted to the selected nodes. As before, this update add/remove channel message will: 1) identify whether this is an addition or removal; and 2) include the updated sent-to-set as opposed to the sent-to-set in the received update add/remove channel message (1805).

With regard to the removal of a channel with live traffic, the flow in FIGS. 17 and 18 is followed with some variation. In particular, each involved access node (the access nodes connected by the link with the channel and the access nodes that receive an update add/remove channel message), determines if they are the source node of any allocated path(s) that includes the link and uses the removed channel. If so, that access node executes a redundancy (protection) scheme.

Link Removal

Figure 19:
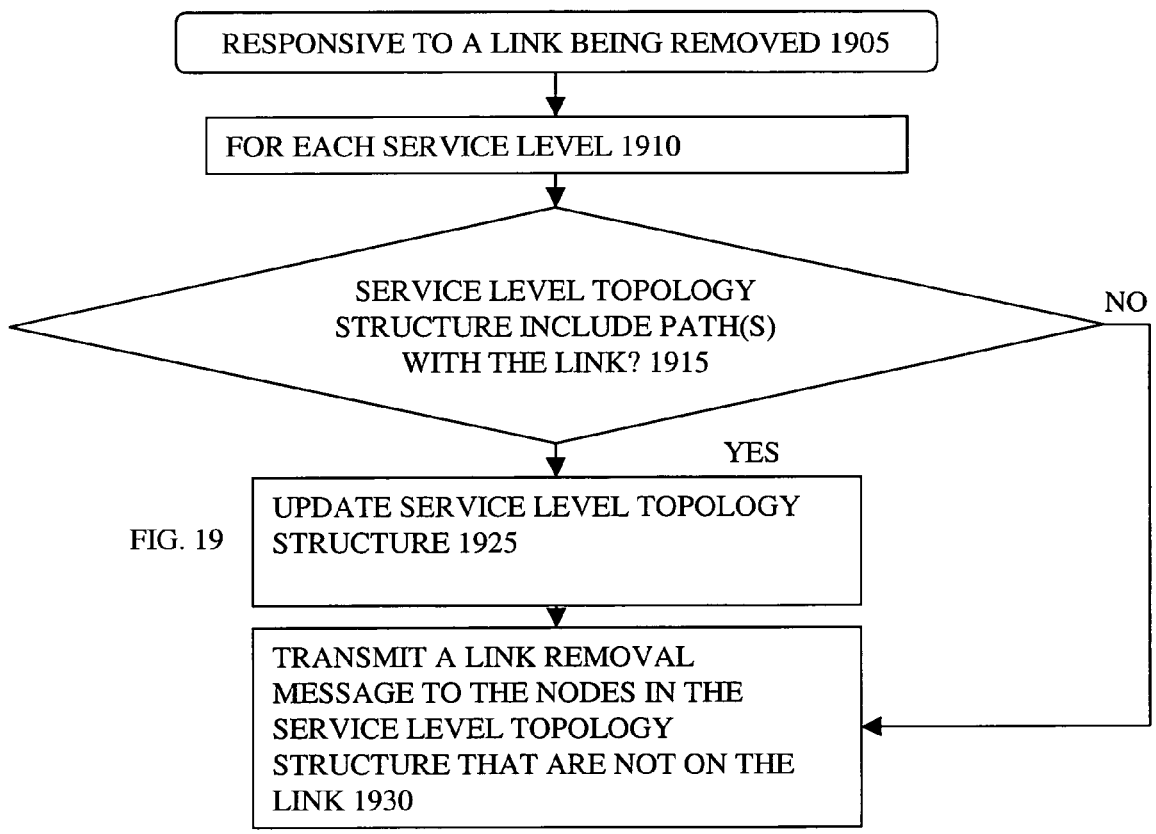
FIG. 19 is a flow diagram illustrating the operations performed by the access nodes connected by the removed link according to certain embodiments of the invention.
Figure 20:
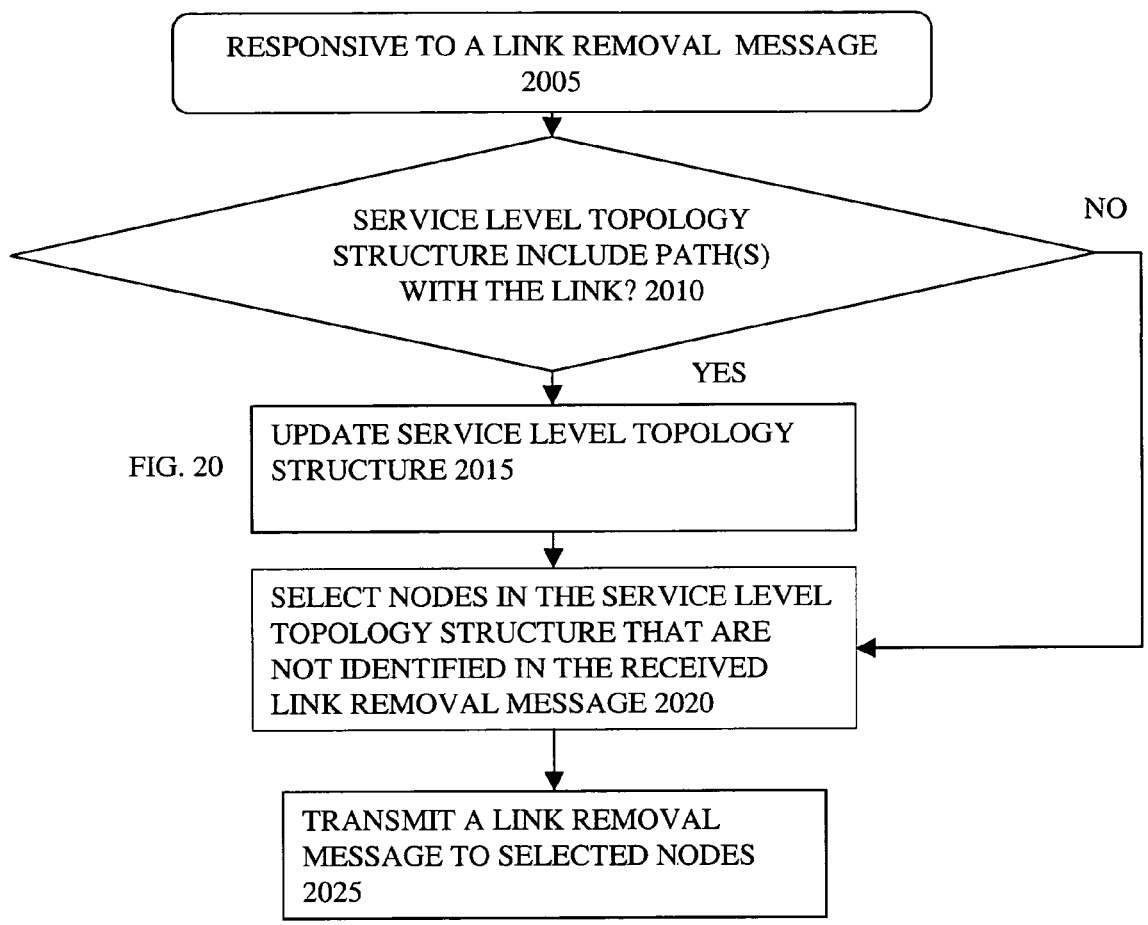
FIG. 20 is a flow diagram illustrating the operations performed by an access node responsive to receiving a link removal message according to certain embodiments of the invention.

When a link is removed (e.g., it fails or is permanently removed) between two nodes within the network, all the channels on that link are lost. While certain embodiments perform the channel removal operations of FIGS. 17 and 18 for each such channel, other embodiments of the invention reduce the number of messages generated by addressing the link as a whole. In particular, FIGS. 19 and 20 are flow diagrams illustrating operations performed when a link is removed according to certain embodiments of the invention. The operations of FIG. 19 are performed by the access nodes connected by the link (also referred to as the adjoining nodes or the access nodes made adjacent by that link). As part of these operations, a link removal message is transmitted to certain other nodes. The operations of FIG. 20 are performed by an access node responsive to such a link removal message.

FIG. 19 is a flow diagram illustrating the operations performed by the access nodes connected by the removed link according to certain embodiments of the invention. Block 1910 is used to indicate that the following blocks are performed for each service level.

As shown in block 1915, it is determined if the service level topology structure includes path(s) with the removed link. If not, control passes to block 1930. If so, control passes to block 1925. In certain embodiments of the invention, block 1915 is performed by searching the service level topology structure for the presence of the removed link.

In block 1925, the service level topology structure is updated and control passes block 1930. In certain embodiments of the invention, any of the channels in these path's path service level channel set(s) that are in common with the link service level channel set of the removed link are marked broken (indicating that the channel(s) cannot be used). While in certain embodiments of the invention channels marked broken are maintained indefinitely, other embodiments of the invention delete such marked channels (and corresponding paths) after a period of time if the link is not reestablished. In other embodiments of the invention, these path(s) and channels are simply deleted immediately and added back in (see the link addition section) if they are reestablished.

As shown in block 1930, a link removal message is transmitted to the nodes in the service level topology structure that are not on the link. In certain embodiments of the invention, each link removal message includes the link service level channel set of the removed link, the source node ID, the source adjacent node ID, an update ID, the service level, and the sent-to-set. The source node and the source adjacent node identified are the access nodes connect to the removed link. The sent-to-set includes the nodes in the service level topology structure that the message is sent to (all nodes in the service level topology structure other than the source node and source adjacent node).

FIG. 20 is a flow diagram illustrating the operations performed by an access node responsive to receiving a link removal message according to certain embodiments of the invention. As shown in block 2010, it is determined if the service level topology structure includes path(s) with the removed link. If not, control passes to block 2020. If so, control passes to block 2015. In certain embodiments of the invention, block 2010 is performed by searching the service level topology structure (for the service level identified in the received link removal message) for the link identified in the received link removal message (based on the source node ID and source adjacent node ID contained therein).

In block 2015, the service level topology structure is updated and control passes block 2020. In certain embodiments of the invention, any of the channels in these path's (identified in block 2010) path service level channel set(s) that are in common with the link service level channel set of the removed link are marked broken (indicating that the channel(s) cannot be used). While in certain embodiments of the invention channels marked broken are maintained indefinitely, other embodiments of the invention delete such marked channels (and corresponding paths) after a period of time if the link is not reestablished. In other embodiments of the invention, these path(s) and channels are simply deleted immediately and added back in (see the link addition section) if they are reestablished.

As shown in block 2020, nodes are selected from the service level topology structure that are not identified in the received link removal message and control passes to block 2025. In certain embodiments of the invention, block 2020 is performed by: 1) identifying as "new set" all of the nodes in the service level topology structure that are not in the sent-to-set in the received link removal message (2005); and 2) forming an updated version of the sent-to-set that is the union of the new set and the sent-to set in the link removal message (2005).

In block 2025, an link removal message is transmitted to the selected nodes. As before, this link removal message will include the updated sent-to-set as opposed to the sent-to-set in the received link removal message (2005).

With regard to the removal of a link with live traffic, the flow in FIGS. 19 and 20 is followed with some variation. In particular, each involved access node (the access nodes connected by the removed link and the access nodes that receive the link removal message), determines if they are the source node of any allocated path(s) that includes the link. If so, that access node executes a redundancy (protection) scheme.

Link Addition

Figure 21:
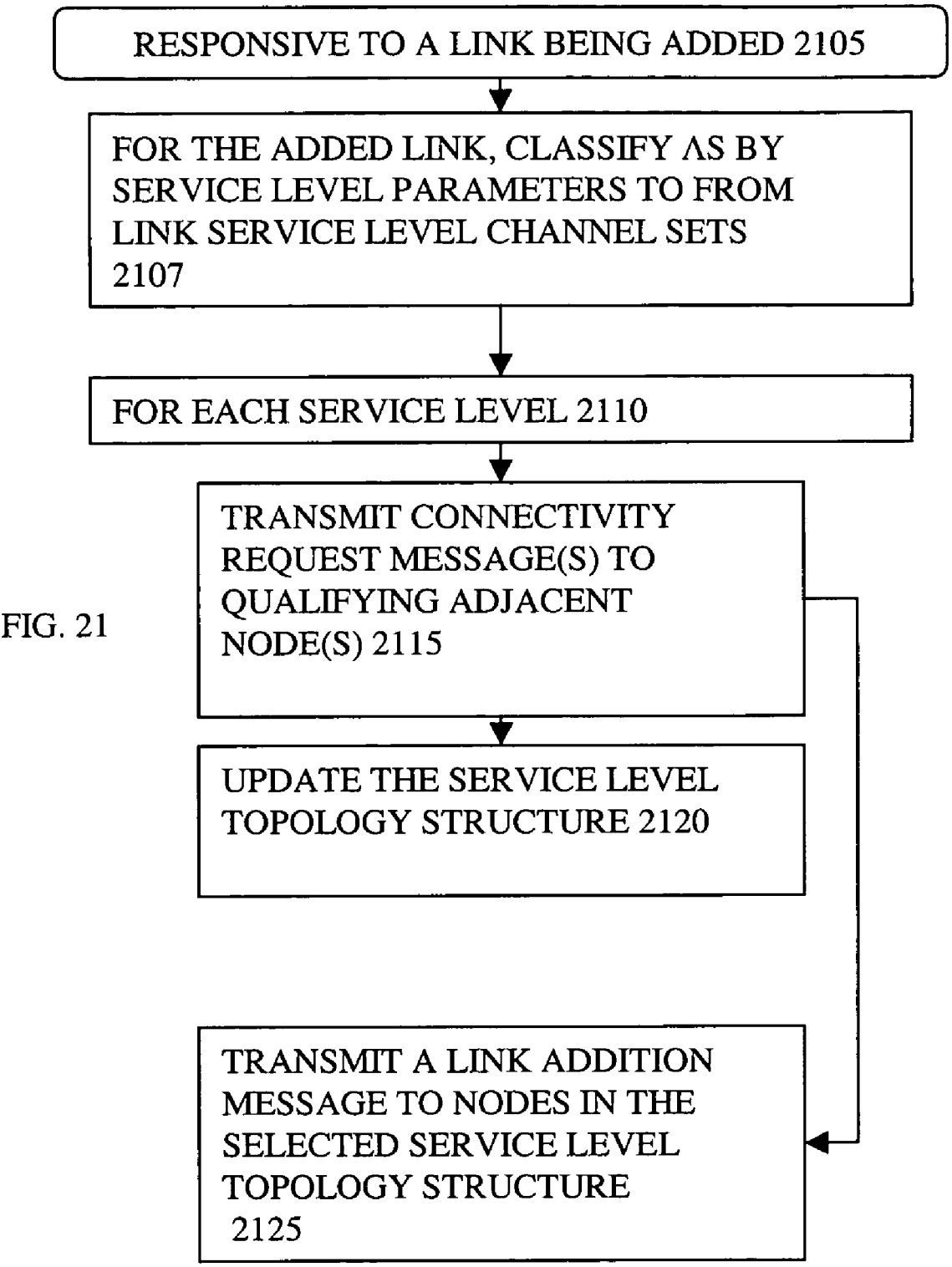
FIG. 21 is a flow diagram illustrating the operations performed by the access nodes connected by the added link according to certain embodiments of the invention.
Figure 22:
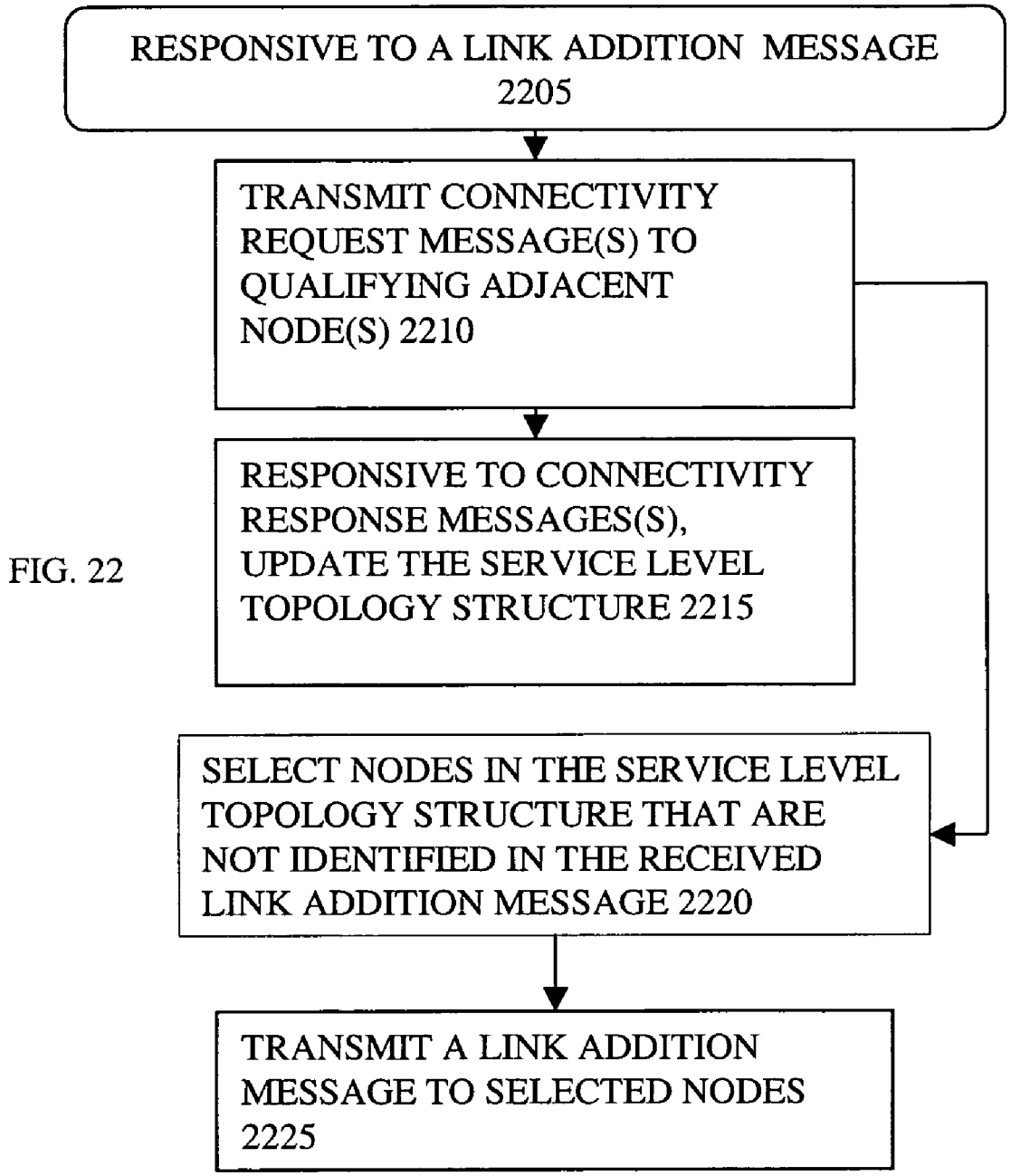
FIG. 22 is a flow diagram illustrating the operations performed by an access node responsive to receiving a link addition message according to certain embodiments of the invention.

When a link is added, the LSD is updated in the access nodes connected to the link (e.g., in certain embodiments of the invention, LMP recognizes the new link). When a link is added between two nodes within the network, a number of channels on that link can be available all at once. While certain embodiments perform the channel addition operations of FIGS. 17 and 18 for each such channel, other embodiment of the invention reduce the number of messages generated by addressing the link as a whole. In particular, FIGS. 21 and 22 are flow diagrams illustrating operations performed when a link is added according to certain embodiments of the invention. The operations of FIG. 21 are performed by the access nodes connected by the link (also referred to as the adjoining nodes or the access nodes made adjacent by that link). As part of these operations, a link addition message is transmitted to certain other nodes. The operations of FIG. 22 are performed by an access node responsive to such a link addition message.

FIG. 21 is a flow diagram illustrating the operations performed by the access nodes connected by the added link according to certain embodiments of the invention. In block 2107, the wavelength(s) on the added link are classified by service level parameters to form link service level channel set(s) and control passes to block 2110. In certain embodiments of the invention, block 2107 is performed in a similar manner to block 915, with the exception that only the added link is processed.

Block 2110 is used to indicate that the following blocks are performed for each service level to which new channels were added (those service levels for which the link service level channel set of the added link is not null).

As shown, in block 2115, connectivity request message(s) are transmitted to the qualifying adjacent node(s) and control passes to blocks 2120 and 2125. In certain embodiments, block 2115 is performed in a similar manner to block 1010.

In block 2120, the service level topology structure is updated. In certain embodiments of the invention, block 2120 is performed in a similar manner to blocks 1005 and 1015 of FIG. 10 with a variation. With regard to the variation on block 1005, the service level topology structure is populated with the access node made adjacent by the added link (the service level topology structure was already populated with any other adjacent nodes). With regard to the variation on block 1015, since certain data already exists in the service level topology structure, the received data in the connectivity response messages is used to update the existing service level topology structure (add what is not already present).

In block 2125, a link addition message is transmitted to nodes in the selected service level topology structure. In certain embodiments, each link addition message includes a service level and a sent-to-set (all of the nodes in the service level topology apart from the source node).

FIG. 22 is a flow diagram illustrating the operations performed by an access node responsive to receiving a link addition message according to certain embodiments of the invention.

As shown, in block 2210, connectivity request message(s) are transmitted to the qualifying adjacent node(s) and control passes to blocks 2215 and 2220. In certain embodiments, block 2210 is performed in a similar manner to block 1010.

In block 2215, the service level topology structure is updated responsive to connectivity response messages received. Block 2215 is performed in a similar fashion to block 1015 of FIG. 10 with a variation. With regard to the variation on block 1015, since certain data already exists in the service level topology structure, the received data in the connectivity response messages is used to update the existing service level topology structure (add what is not already present).

As shown in block 2220, nodes are selected from the service level topology structure that are not identified in the received link addition message and control passes to block 2225. In certain embodiments of the invention, block 2220 is performed by: 1) identifying as "new set" all of the nodes in the service level topology structure that are not in the sent-to-set in the received link addition message (2205); and 2) forming an updated version of the sent-to-set that is the union of the new set and the sent-to set in the link addition message (2205).

In block 2225, a link addition message is transmitted to the selected nodes. As before, this link addition message will include the updated sent-to-set as opposed to the sent-to-set in the received link addition message (2205).

Node Removal

Figure 23:
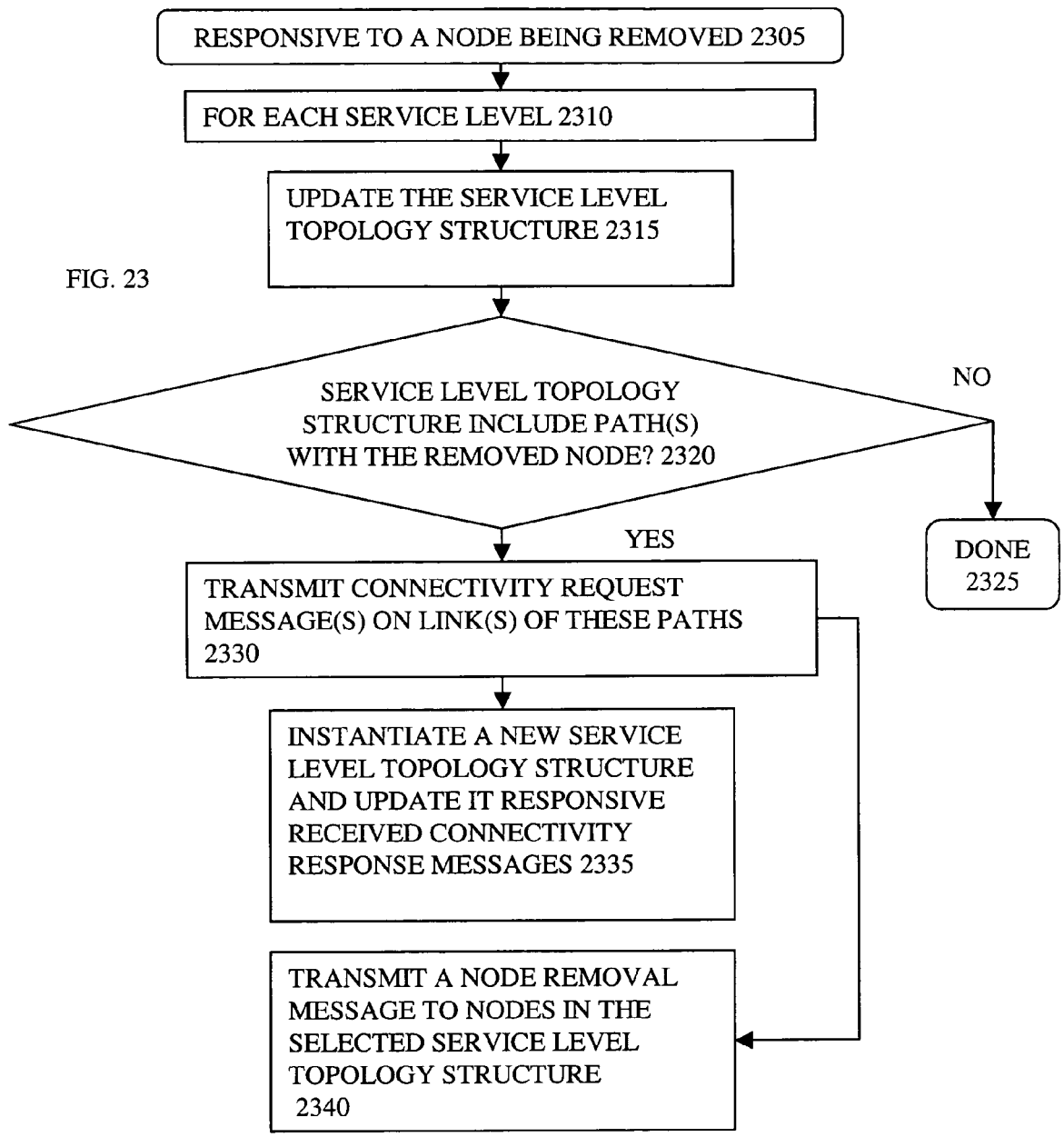
FIG. 23 is a flow diagram illustrating the operations performed by the access node(s) adjacent a removed node according to certain embodiments of the invention.
Figure 24:
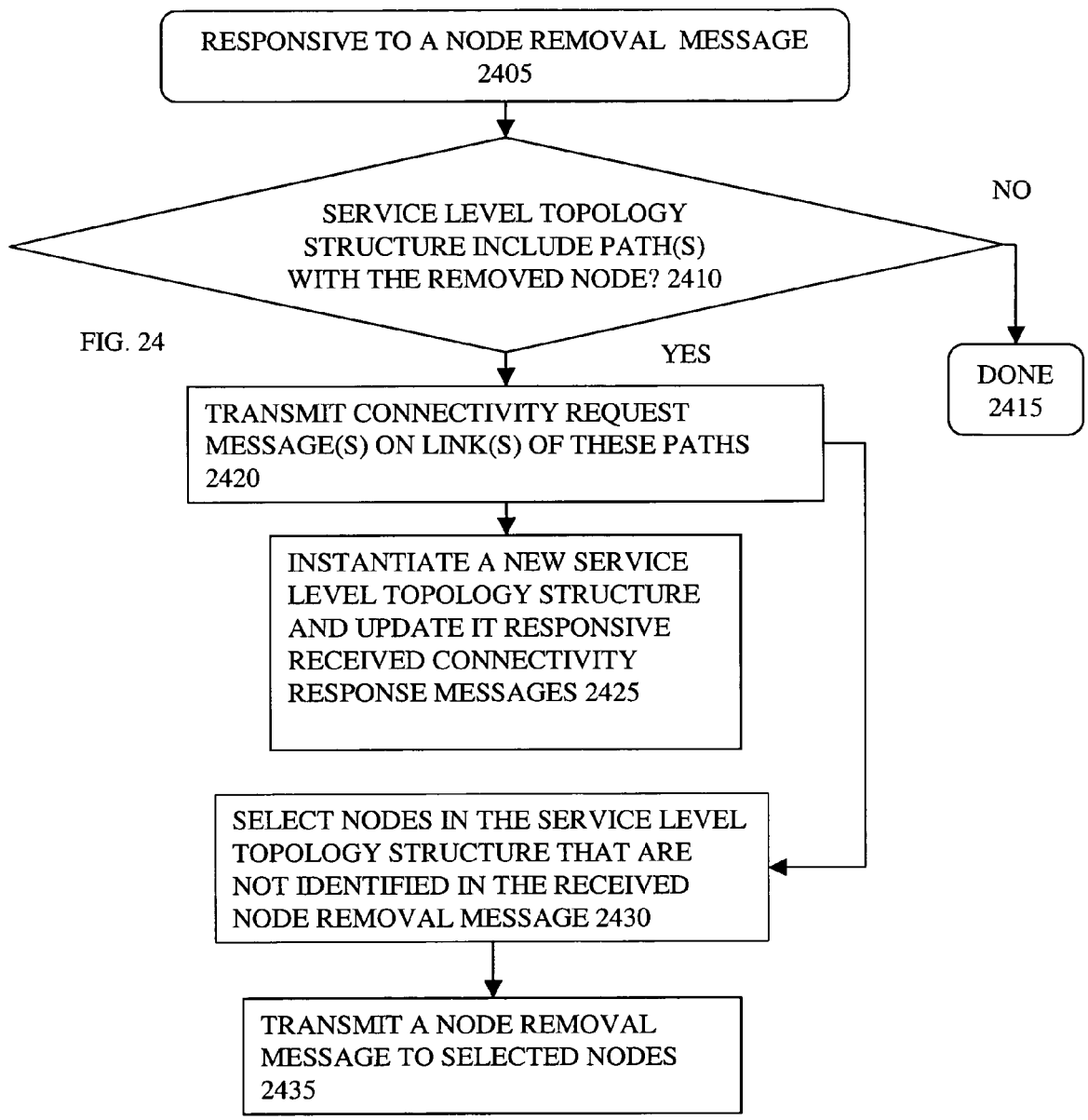
FIG. 24 is a flow diagram illustrating the operations performed by an access node responsive to receiving a node removal message according to certain embodiments of the invention.

When a node is removed, the LSD is updated in the adjacent access node(s) (e.g., in certain embodiments of the invention, LMP recognizes the removal of the node). When a node is removed, the channels on its link(s) are no longer available all at once. While certain embodiments perform the link removal operations of FIGS. 19 and 20 for each such link, other embodiment of the invention reduce the number of messages generated by addressing the node as a whole. In particular, FIGS. 23 and 24 are flow diagrams illustrating operations performed when a node is removed according to certain embodiments of the invention. The operations of FIG. 23 are performed by the adjacent access node(s). As part of these operations, a node removal message is transmitted to certain other nodes. The operations of FIG. 24 are performed by an access node responsive to such a node removal message.

FIG. 23 is a flow diagram illustrating the operations performed by the access node(s) adjacent a removed node according to certain embodiments of the invention. Block 2310 is used to indicate that the following blocks are performed for each service level.

In block 2315, the service level topology structure is updated and control passes to block 2320. In certain embodiments of the invention, block 2315 is performed by removing from the service level topology structure the branch, if one exists, that has as the first hop the removed node.

As shown in block 2320, it is determined if the service level topology structure includes path(s) with the removed node. If not, control passes to block 2325 where the flow diagram ends. If so, control passes to block 2330. In certain embodiments of the invention, block 2320 is performed by searching the service level topology structure for the presence of the removed node.

As shown, in block 2330, connectivity request message(s) are transmitted on link(s) of these paths and control passes to blocks 2335 and 2340. In particular, the access node transmits a connectivity request message on each of its links that are part of these paths.

In block 2335, a new service level topology structure is instantiated and updated responsive to connectivity response messages received. In certain embodiments, block 2325 is performed in a similar manner as blocks 1005 and 1015 with a variation. In particular, the new service level topology structure preserves the channel states from the current service level topology structure (which is kept until the new service level topology structure is completed).

In block 2340, a node removal message is transmitted to nodes in the selected service level topology structure. In certain embodiments of the invention which instantiate a new service level topology structure as in block 2325, the service level topology structure used for block 2330 is the current service level topology structure. In certain embodiments, each link removal message includes a removed node ID, a service level, and a sent-to-set (all of the nodes in the service level topology apart from the removed node and the nodes adjacent the removed node).

FIG. 24 is a flow diagram illustrating the operations performed by an access node responsive to receiving a node removal message according to certain embodiments of the invention.

In block 2410, it is determined if the service level topology structure includes path(s) with the removed node. If not, control passes to block 2415 where the flow diagram ends. If so, control passes to block 2420. In certain embodiments of the invention, block 2410 is performed by searching the service level topology structure for the presence of the removed node.

As shown, in block 2420, connectivity request message(s) are transmitted on link(s) of these paths and control passes to blocks 2425 and 2430. In particular, the access node transmits a connectivity request message on each of its links that are part of these paths.

In block 2425, a new service level topology structure is instantiated and updated responsive to connectivity response messages received. In certain embodiments, block 2425 is performed in a similar manner as blocks 1005 and 1015 with a variation. In particular, the new service level topology structure preserves the channel states from the current service level topology structure (which is kept until the new service level topology structure is completed).

As shown in block 2430, nodes are selected from the service level topology structure that are not identified in the received node removal message and control passes to block 2435. In certain embodiments of the invention, block 2430 is performed by: 1) identifying as "new set" all of the nodes in the current service level topology structure that are not in the sent-to-set in the received node removal message (2405); and 2) forming an updated version of the sent-to-set that is the union of the new set and the sent-to set in the node removal message (2405).

In block 2435, a node removal message is transmitted to the selected nodes. As before, this node removal message will include the updated sent-to-set as opposed to the sent-to-set in the received node removal message (2405).

While in certain embodiments of the invention, nodes and their paths are deleted immediately and added back in (see the node addition section) if they are reestablished, alternative embodiments provide other mechanisms (e.g., in certain embodiments of the invention the paths are marked broken are maintained indefinitely, in other embodiments of the invention the paths are marked broken and deleted after a period of time if the node is not reestablished, etc.).

Node Addition

When a node is added, the added node performs the flows in FIGS. 9 and 10. In addition, the LSD is updated in the adjacent access node(s) (e.g., in certain embodiments of the invention, LMP recognizes the removal of the node). Additionally, for each of the adjacent nodes, there has effectively been one or more links added to the new node. As such, each of the adjacent node(s) performs the flow of FIG. 21, with the exception that block 2125 is replaced with a different operation. In particular, instead of block 2125, a node addition message is transmitted to nodes in the selected service level topology structure. In certain embodiments, each node addition message includes an added node ID, a service level and a sent-to-set. The message is sent to, and the sent-to-set includes, any nodes in the service level topology apart from the source node.

FIG. 25 is a flow diagram illustrating the operations performed by an access node responsive to receiving a node addition message according to certain embodiments of the invention.

As shown, in block 2510, connectivity request message(s) are transmitted to the qualifying adjacent node(s) and control passes to blocks 2515 and 2520. In certain embodiments, block 2510 is performed in a similar manner to block 1010.

In block 2515, a new service level topology structure is instantiated and updated responsive to connectivity response messages received. In certain embodiments, block 2515 is performed in a similar manner as blocks 1005 and 1015 with a variation. In particular, the new service level topology structure preserves the channel states from the current service level topology structure (which is kept until the new service level topology structure is completed).

As shown in block 2520, nodes are selected from the service level topology structure that are not identified in the received node addition message and control passes to block 2525. In certain embodiments of the invention, block 2520 is performed by: 1) identifying as "new set" all of the nodes in the current service level topology structure that are not in the sent-to-set in the received node addition message (2505); and 2) forming an updated version of the sent-to-set that is the union of the new set and the sent-to set in the node addition message (2505).

In block 2525, a node addition message is transmitted to the selected nodes. As before, this node addition message will include the updated sent-to-set as opposed to the sent-to-set in the received node addition message (2505).

Service Level Parameter Changes

In certain embodiments of the invention, the service provider may update the service level parameters and push a fresh copy on each node. If and when a new QoS criteria is added, certain embodiments of the invention perform the following:

1. The contents of the service level parameters database is copied and kept in the memory.
2. The service level parameters database is populated with new data.
3. Blocks 915 and 920 are performed to create new service level topology structures, keeping the existing service level topology structure for each service level.
4. The new service level topology structures are used for new connections.
5. The previous service levels are mapped to the current service levels by comparing the parameters.
6. The connection status from the old service level topologies are mapped to the new service level topology structures to relevant service levels.
7. The old service level topologies are deleted.

Similarly, if an when an existing service level parameter(s) is changed, certain embodiments of the invention perform the following:

1. The contents of the particular level in service level parameters database is copied and kept in the memory.
2. The service level parameters database is populated with new data.
3. New service level topology structures are built for the updated levels keeping the old service level topology structures.
4. The new service level topology structures are used for new connections.
5. The previous service levels are mapped to the current service levels by comparing the parameters.
6. The connection status from the old service level topologies are mapped to the new service level topology structures to relevant service levels.
7. The old service level topologies are deleted.

Of course, alternative embodiments may handle such changes in other ways.

Exemplary Load Balancing

Where there are multiple shortest paths available, the issue of load balancing comes into play. For instance, certain embodiments of the invention implement load balancing to allow the service provider some options. Specifically, when a demand is received, there can either be: 1) a set of multiple shortest paths; or 2) a single shortest path. Where there is a set of multiple shortest paths, wavelengths are selected from each member of the set in round robin fashion. However, when there is a single shortest path, either one of two schemes is used. In the first scheme, a threshold is specified (e.g., specified by the service provider) for any link in the network. If the number of channels for a particular service level crosses the threshold on that link, then that link becomes unavailable for any future demand. This allows the service provider to tailor the traffic flow on the network. In the second scheme, a distribution ratio system is used. Specifically, the ratio is the number of new paths "allocated to non-shortest path" to "the shortest path."

Exemplary Contention Resolution

Since requests for paths by different access nodes may overlap, there is a need for contention resolution. Certain embodiments of the invention resolve contention issues by giving priority to the source with the higher IP number. However, this brings in a special case where a source node may be receiving demand request at a higher frequency than the other source node. The other source node, thus, potentially may starve.

Other embodiments of the invention use one of the following contention resolution schemes to overcome this deficiency.

1. One such scheme is to pre-allocate a lightpath for the next demand in advance. This result in each access node preallocating lightpaths to each accessible node at each service level. As such, this scheme can put a relatively high amount of strain on network resources.
2. Another such scheme is referred to herein as highest service level preallocation. Instead of preallocating lightpaths to each accessible node for each service level, this is done only for the highest service level. In the case of an unfavorable settlement of contention during demand allocation, the demand is allocated on the pre-allocated lightpath at the highest service level. As such, this scheme puts a relatively lower amount of strain on network resources, but can cause the highest service level lightpaths to get used up the fastest.
3. Yet another, such scheme is referred to herein as default service level preallocation. In particular, for each source to destination pair, an indication of the default service level is maintained (e.g., the most common service level for historically received demands). Instead of preallocating lightpaths to each accessible node for each service level or preallocating lightpaths to each accessible node at the highest service level, preallocation is done only for the default service level for each source to destination pair. In the case of an unfavorable settlement of contention during demand allocation, the demand is allocated on the preallocated lightpath at the default service level. As such, this scheme puts a relatively lower amount of strain on network resources than scheme 1 and attempts to avoid using up the highest service level the fastest by predicting the most common service level.

Aggregating

While embodiments have been described in which separate messages are transmitted, alternative embodiments aggregate different ones of such messages. For instance, certain embodiments aggregate messages for different service level topologies during startup.

Alternative Embodiments

While various embodiments of the invention has been described, alternative embodiments of the invention can operate differently. For instance, while the flow diagrams in the figures show a particular order of operations performed by certain embodiments of the invention, it should be understood that such order is exemplary (e.g., alternative embodiments may perform the operations in a different order, combine certain operations, overlap certain operations, etc.) In addition, while certain embodiments have been described that operate to reduce the number of communications between nodes by transmitting messages to only selected nodes (e.g., blocks 1250, 1320, 1430/1435, 1525, 1630/1635, 1725, and 1830/1835), alternative embodiments may be implemented to transmit such messages to more, less, or different nodes using different schemes (e.g., certain alternative embodiments broadcast each such message to every node). As another example, while certain embodiments of the invention have been described with respect to distributed search techniques for building/maintaining network topology databases and with respect to a source based scheme, alternative embodiments could be implemented different ways or combinations of ways (e.g., centralized network topology database building/maintaining, centralized provisioning, hybrids, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method to update a network topology specific to a first of a plurality of access nodes based on a topology change in network resources, the method comprising:

detecting the topology change in a wavelength division multiplexing optical network including the plurality of access nodes, wherein said topology change is one of addition of a channel, removal of a channel, addition of a link, addition of an access node, and removal of an access node;

responsive to detecting the topology change,
at least a first of said plurality of access nodes performing the following,
transmitting a message regarding said topology change to others of said plurality of access nodes in said optical network based on a database representing communication paths from said first node to others of the plurality of access nodes, said topology change message identifies a topology change type and which ones of the plurality of access nodes are directly affected by the topology change, and transmitting a connectivity request message to a set of one or more adjacent ones of said plurality of access nodes to discover changes to said communication paths; and the other access nodes, responsive to receiving said topology change message, each performing the following,
transmitting an updated version of the topology change message to those of said plurality of access nodes with which there is communication path and that are not already identified in the received message, and determining any adjacent nodes of said plurality of access nodes to which an identified communication path that the received connectivity request message has already collected can be extended to form additional communication paths having the first access node as the source node, and transmitting back to the first access node a connectivity response message, wherein the connectivity response message includes that determination for incorporation into the database.

2. The method of claim 1, wherein said transmitting said topology change message includes the following:

selecting as the other access nodes, those of said plurality of access nodes with which there is a communication path.

3. The method of claim 1, wherein said transmitting said topology change message includes the following:

selecting as the other access nodes those of said plurality of access nodes with which there is a communication path and that are not connected to the network resource that changed.

4. The method of claim 1, further comprising:
said first node updating said database.

5. The method of claim 1, further comprising:
those of said plurality of access nodes receiving a connectivity request message
propagating said connectivity request message to the any adjacent nodes; and
said first access node updating said database responsive to receiving said connectivity response messages.

6. The method of claim 1, wherein:
at least a second of said plurality of access nodes, responsive to receiving the topology change message or the updated version of the topology change message, transmitting a connectivity request message to a set of one or more adjacent ones of said plurality of access nodes to discover changes to said second access node's connectivity, wherein the set of one or more adjacent access nodes are on communication paths originating from the second access node affected by the topology change;
those of said plurality of access nodes receiving a connectivity request message, performing the following,
transmitting back to the second access node a connectivity response message, and
propagating said connectivity request message to any adjacent ones of said plurality of access nodes that may be able to determine additional communication paths having the second access node as the source node; and
said second access node updating a database responsive to receiving said connectivity request messages.

7. The apparatus of claim 1, wherein the optical network employs a source based scheme for establishing the communication paths.

8. The apparatus of claim 1, wherein said communication paths include one or more of optical circuits, lightpaths, and end-to-end unidirectional paths.

9. The method of claim 1, wherein the topology change type is one of addition and removal of a channel and the access nodes directly affected by the topology change are the two access nodes connected by the link containing the channel.

10. The method of claim 1, wherein the topology change type is one of addition and removal of a third access node and the access nodes directly affected by the topology change is the third access node.

11. A method to update a network topology specific to a first access node based on a topology change in network resources, the method comprising:

receiving a topology change message at the first access node indicating the topology change in the network resources of a wavelength division multiplexing optical network, the optical network comprising a plurality of access nodes, wherein the plurality of access nodes includes the first access node, and wherein said topology change is one of addition of a channel, removal of a channel, addition of a link, addition of a node, and removal of a node;

performing in the first access node, responsive to receiving the topology change message, the following, updating a database that stores a topology for the first access node;

determining a plurality of communication paths that are affected by the change in network resources indicated in the received topology change message; and transmitting a connectivity request message to adjacent access nodes on the plurality of communication paths affected by the change in network resources, wherein the connectivity request message is used to discover changes in the network topology specific to the first access node.

12. The method of claim 11, further comprising:
said first access node receiving connectivity response messages.

13. The method of claim 12, wherein said updating includes:
instantiating a new topology database based on said connectivity response messages.

14. The method of claim 11, herein the optical network employs a source based scheme for establishing the communication paths.

15. The method of claim 11, wherein said plurality of communication paths includes one or more of optical circuits, lightpaths, and end-to-end unidirectional paths.

16. A machine-readable storage medium that provides instructions that, if executed by a machine, will cause said machine to perform operations to update a network topology specific to a first access node based on a topology changes in network resources, the operations comprising:

receiving a topology change message at the first access node indicating the topology change in the network resources of a wavelength division multiplexing optical network, the optical network comprising a plurality of access nodes, wherein the plurality of access nodes includes the first access node, and wherein said topology change is one of addition of a channel, removal of a channel, addition of a link, addition of a node, and removal of a node;

performing in the first access node, responsive to receiving a the topology change message, the following, updating a database that stores a topology for the first access node;

determining a plurality of communication paths that are affected by the change in network resources indicated in the received topology change message; and transmitting a connectivity request message to adjacent access nodes on the plurality of communication paths affected by the change in network resources, wherein the connectivity request message is used to discover changes in the network topology specific to the first access node.

17. The machine-readable storage medium of claim 16, further comprising:
said first access node receiving connectivity response messages.

18. The machine-readable storage medium of claim 17, wherein said updating includes:
instantiating a new topology database based on said connectivity response messages.

19. The machine-readable storage medium of claim 16, wherein the optical network employs a source based scheme for establishing the communication paths.

20. The machine-readable storage medium of claim 16, wherein said plurality of communication paths includes one or more of optical circuits, lightpaths, and end-to-end unidirectional paths.

* * * * *